(12) United States Patent
Gealy et al.

(10) Patent No.: US 11,945,102 B2
(45) Date of Patent: Apr. 2, 2024

(54) END EFFECTOR DEVICE AND SYSTEM FOR SUCTION-BASED GRASPING OF BAGGED OBJECTS

(71) Applicant: Ambi Robotics, Inc., Emeryville, CA (US)

(72) Inventors: David Gealy, Berkeley, CA (US); Stephen McKinley, Berkeley, CA (US); Jeffrey Mahler, Berkeley, CA (US)

(73) Assignee: Ambi Robotics, Inc., Emeryville, CA (US)

( * ) Notice: Subject to any disclaimer, the term of this patent is extended or adjusted under 35 U.S.C. 154(b) by 0 days.

(21) Appl. No.: 17/220,694

(22) Filed: Apr. 1, 2021

(65) Prior Publication Data

US 2021/0308875 A1 Oct. 7, 2021

Related U.S. Application Data

(60) Provisional application No. 63/003,728, filed on Apr. 1, 2020.

(51) Int. Cl.
*B25J 15/06* (2006.01)
*B25J 15/00* (2006.01)

(52) U.S. Cl.
CPC ....... *B25J 15/0683* (2013.01); *B25J 15/0052* (2013.01)

(58) Field of Classification Search
CPC ................ B25J 15/0683; B25J 15/0033; B25J 15/0052; B66C 1/0243; B66C 1/0206; B66C 1/0231
USPC ........................................................ 294/188
See application file for complete search history.

(56) References Cited

U.S. PATENT DOCUMENTS

| | | | | |
|---|---|---|---|---|
| 2,702,038 A | * | 2/1955 | Uddenberg et al. | A61B 17/442 606/123 |
| 2,916,059 A | * | 12/1959 | Wong | B65B 31/047 53/512 |
| 3,005,652 A | * | 10/1961 | Helm | B66C 1/0212 294/189 |

(Continued)

FOREIGN PATENT DOCUMENTS

WO WO 2021/202894 10/2021

OTHER PUBLICATIONS

Non-Final Office Action for U.S. Appl. No. 17/220,679 dated Jun. 9, 2023.

(Continued)

*Primary Examiner* — Dean J Kramer
(74) *Attorney, Agent, or Firm* — Vista IP Law Group, LLP

(57) ABSTRACT

An end effector device and system for suction-based grasping of bagged objects that can include a body structure with a vacuum line opening and an object engagement region, the vacuum line opening being configured to couple at least one pressure line of a vacuum pressure system to a defined internal channel of the body structure; the body structure comprising an internal structure that defines a concave inner chamber with a chamber opening at the object engagement region; and the internal structure comprising an array of inlets positioned along at least one wall of the concave inner chamber, wherein each inlet defines an opening in the body to the defined internal channel.

19 Claims, 28 Drawing Sheets

(56) References Cited

U.S. PATENT DOCUMENTS

| | | | | |
|---|---|---|---|---|
| 3,743,340 | A * | 7/1973 | Williamann | B66C 1/0212 |
| | | | | 294/186 |
| 3,901,502 | A * | 8/1975 | Vits | B65H 3/0883 |
| | | | | 271/106 |
| 4,505,505 | A * | 3/1985 | Senaratne | B65G 47/91 |
| | | | | 294/188 |
| 4,917,427 | A * | 4/1990 | Scaglia | B65G 47/91 |
| | | | | 414/627 |
| 5,192,070 | A * | 3/1993 | Nagai | B25J 15/0683 |
| | | | | 271/90 |
| 5,344,202 | A | 9/1994 | Ramler et al. | |
| 5,882,055 | A | 3/1999 | Smith | |
| 6,193,291 | B1 * | 2/2001 | Morroney | B25B 11/007 |
| | | | | 294/189 |
| 6,517,130 | B1 | 2/2003 | Donoso et al. | |
| 7,000,964 | B1 | 2/2006 | Porras et al. | |
| 8,251,415 | B2 | 8/2012 | Lomerson | |
| 8,560,121 | B2 | 10/2013 | Hjørnet | |
| 8,960,751 | B2 | 2/2015 | Regan et al. | |
| 2002/0047352 | A1 | 4/2002 | Shimizu | |
| 2012/0319416 | A1 * | 12/2012 | Ellis | B25J 15/0616 |
| | | | | 414/800 |
| 2019/0061174 | A1 | 2/2019 | Robinson et al. | |
| 2019/0240847 | A1 * | 8/2019 | Quast | B65G 47/91 |
| 2020/0047352 | A1 | 2/2020 | Nakayama et al. | |
| 2020/0048014 | A1 * | 2/2020 | Nakayama | B25J 15/0616 |
| 2021/0308874 | A1 | 10/2021 | Gealy et al. | |
| 2021/0308875 | A1 | 10/2021 | Gealy et al. | |

OTHER PUBLICATIONS

Final Office Action for U.S. Appl. No. 17/220,679 dated Apr. 5, 2023.
Non-Final Office Action for U.S. Appl. No. 17/220,679 dated Sep. 19, 2022.
Search Report for EP Patent Appln. No. 21778867.8 dated Jul. 14, 2021.
PCT International Search Report for International Appln. No. PCT/US21/25410, Applicant Ambidextrous, Inc., dated Jul. 14, 2021 (23 pages).
Notice of Allowance for U.S. Appl. No. 17/220,679 dated Nov. 29, 2023.

* cited by examiner

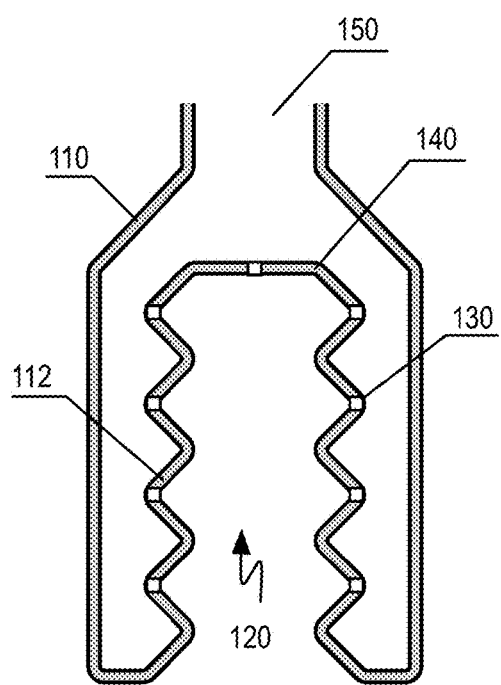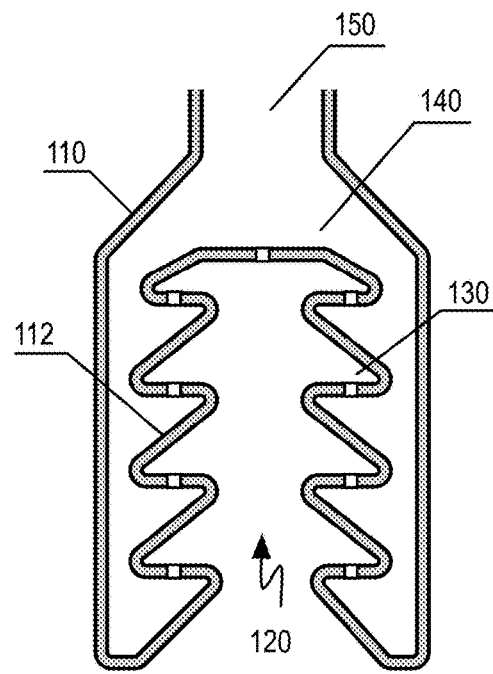
FIGURE 11A                    FIGURE 11B

END EFFECTOR DEVICE AND SYSTEM FOR SUCTION-BASED GRASPING OF BAGGED OBJECTS

CROSS-REFERENCE TO RELATED APPLICATIONS

This Application claims the benefit of U.S. Provisional Application No. 63/003,728, filed on 1 Apr. 2020, which is incorporated in its entirety by this reference.

TECHNICAL FIELD

This invention relates generally to the field of pick and place end effectors, and more specifically to a new and useful end effector device and system for suction-based grasping of bag wrapped objects.

BACKGROUND

Pick and place devices frequently use suction cup type end effectors for picking up objects. The suction cup end effectors are used with controlled pressure vacuum systems to establish a pressure-based seal when grasping an object for manipulation. A typical type of end effector is a suction cup device made of flexible material with a series of bellows connected to the engagement side of the end effector. While these end effectors are useful for some materials like rigid objects with flat surfaces, they are not as useful for all types of objects and have low probability of success at gripping items wrapped in deformable membranes such as plastic or silicone bags.

Grasping and manipulation of bagged goods is a common objective. With the rise of e-commerce, there is an increasing demand for automation involving bagged goods. However, grabbing a bagged item using a suction cup end effector has many issues. One primary challenge is that a loose bag membrane can slide or roll when the object is grasped. This can break the pressure-based seal holding the item resulting in a dropped item. Material rolling can be a large issue particularly when holding a bagged object at an angle to gravity. The weight of an object can apply a pulling force on the bag where the bag rolls and peels down the face of the suction cup, breaking the seal.

Additionally, many suction cup designs have thin flexible flanges that traditionally must deform to conform to a flexible surface like a bag. However, these thin and flexible materials are prone to breakdown and have a limited usable lifecycle.

Alternative end effectors like actuated grippers maybe used but they require an additional mechanism and have other challenges in dealing with bagged objects.

Dealing with bagged items presents an even greater challenge when a pick and place device must deal with handling a diversity of types of packaged items such as bagged items and boxed items.

Thus, there is a need in the pick-and-place end effectors field to create a new and useful end effector device and system for suction-based grasping of bag wrapped objects. This invention provides such a new and useful system and method.

BRIEF DESCRIPTION OF THE FIGURES

FIGS. 11A and 11B are side cross sectional schematic representations of two different variations where the inner chamber includes side internal walls with a patterned surface.

DESCRIPTION OF THE EMBODIMENTS

The following description of the embodiments of the invention is not intended to limit the invention to these embodiments but rather to enable a person skilled in the art to make and use this invention.

1. Overview

An end effector device and system for suction-based grasping of bag wrapped objects functions to use an internal restorative volume formed by an inner concave chamber. The restorative volume engages with bagged goods by pulling a portion of the hag material into the volume for pressurized grasping.

The end effector may be used with a variety of types of objects but may have enhanced performance for bagged objects and/or other objects with a flexible membranous gripping surface. In some variations, the end effector may be an end effector that can have high performance across a variety item types. For example, a hybrid end effector variation that includes integration of a suction cup flexible sealing lip, which may be suitable for grasping of boxed/solid items and bagged items, with the end effector naturally engaging with the item in a manner appropriate for that type of item.

Herein, "bagged object" is referenced as the general type of object that is gripped and manipulated but any suitable type of object may additionally or alternatively be used with the end effector.

As shown in the exemplary variations of the system in FIGS. 1A-1F, the end effector can leverage a rigid (or at least a semi-rigid) structure that forms a defined concave inner chamber with at least a subset of inlets recessed from an inner chamber opening.

Figure 1A:
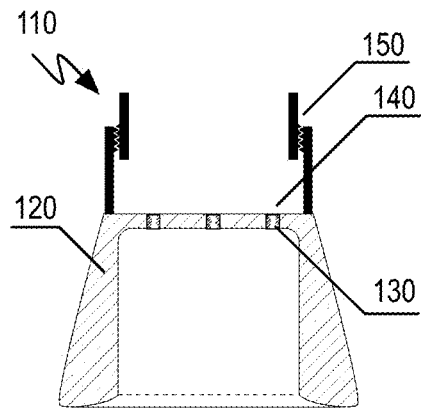
FIGS. 1A-1F are side cross sectional schematics of exemplary variations of the end effector with a concave inner chamber.
Figure 1B:
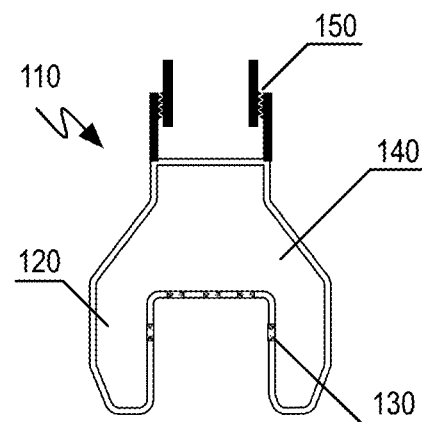

As show in exemplary variations of FIGS. 1A and 1B, an array of inlets may be positioned in various positions to augment how a bagged item is pulled and grasped within the inner chamber.

Figure 1C:
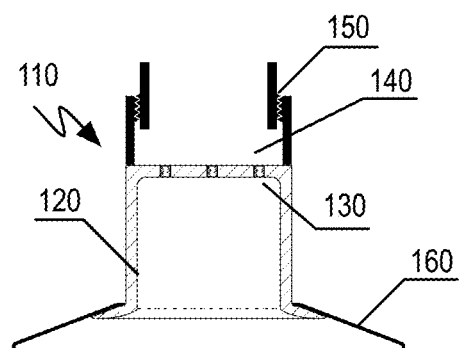
Figure 1D:
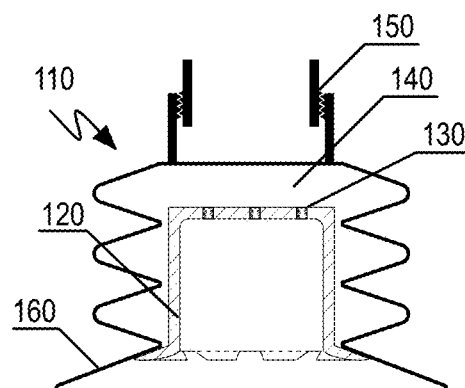

As shown in exemplary variations of FIGS. 1C and 1D, a hybrid variation can integrate a suction cup system. In a hybrid variation, the end effector device and system for suction-based grasping may include a surrounding flexible sealing lip, which can enable the end effector device to act as a suction cup end effector against suitable objects such as boxes or items with hard surfaces (or tightly bagged items), but for bagged items to be grasped through interaction with the concave chamber.

Figure 1E:
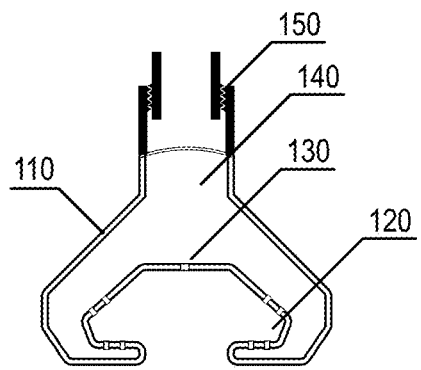
Figure 1F:
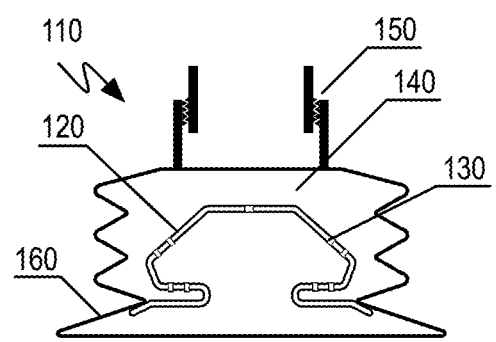

In some variations for further enhanced bag grasping, such as those shown in FIGS. 1E and 1F, the end effector device and system for suction-based grasping may employ the use of an array of multi-directional inlets in varying orientations as well as structural variations in the surface of the inner chamber. In some such variations, the concave chamber may further be an expanded concave chamber with a lip. The position of inlets and/or the differing directions of pressurized force may improve the end effector's grasping of a bag and the end effector's ability to manipulate bagged goods without the bag deforming and breaking the vacuum seal.

The various end effector design feature described herein may be combined in various combinations, such as shown in the examples of FIGS. 1A-1F. For example, a hybrid end effector can include a concave inner chamber with an array of inlets with varying orientations and structural features like a structural chamber opening lip and a suction cup system as shown in FIG. 1F. This may function to enable a hybrid end effector with enhanced bag grasping and manipulation capabilities. Other suitable feature combinations may alternatively be used.

The end effector is preferably coupled to a vacuum system and attached to a robotic actuation system. The end effector design may additionally be incorporated into a multi-headed end effector where one or multiple instances of the system are used possibly in combination with other types of end effectors.

The end effector can preferably be used for a pick and place robotic system or any suitable object manipulation system that is used to manipulate bagged goods and possibly other suitable goods. However, the end effector may alternatively be used with any suitable system that is designed to grab an object and in particular bagged objects. For example, the end effector may additionally have utility in object manipulation machines used in manufacturing, assembly, food preparation, food packaging, medical kitting, medical processing, and/or object processing systems.

The end effector and system for suction-based grasping may employ a variety of design features that promote improved grasping capabilities.

As one potential principal, the inner chamber provides a restorative volume in which a portion of the bag is pulled into the chamber. The flexible material of a bagged item, when it engages with the system, is pulled within the internal concave chamber, providing a better grasp.

As another potential principal, the chamber expands the surface area of the bagging material onto which the inlets can apply a suction force. By varying the shape profile of the internal concave chamber and/or the depth/size of the chamber different chamber designs may be used for different flexible material grasping capabilities. These may be varied depending on the targeted type of grasped material, diversity of grasped materials/items, types of item manipulation, and/or other performance properties.

As yet another principal, the end effector may diversify the direction(s) of the suction forces. Inlets can be positioned along different defined planes on the internal concave chamber. In some cases, inlets of the internal concave chamber can be positioned so that the suction force is in a direction opposite that of the direction at the chamber opening to increase the friction force between the membrane and the end-effector chamber opening. When coupled with structural features that impede or prevent material peeling or slippage, this can result in a more secure grasp of bagged goods.

Figure 2A:
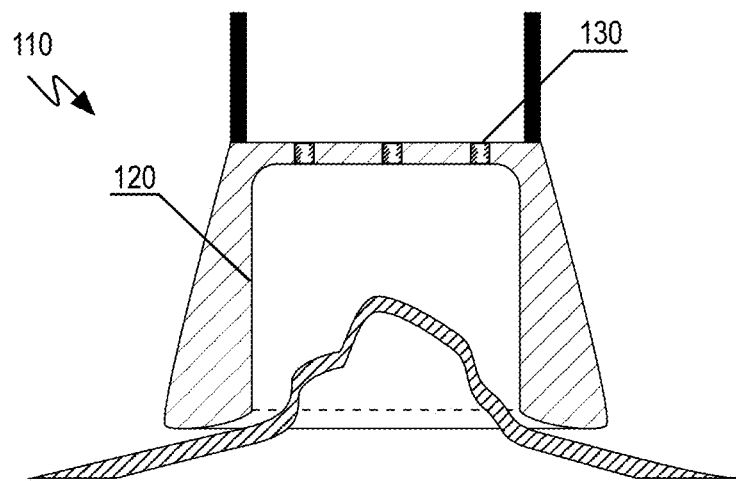
FIGS. 2A and 2B are side cross sectional schematics of bag interactions with the end effector.
Figure 2B:
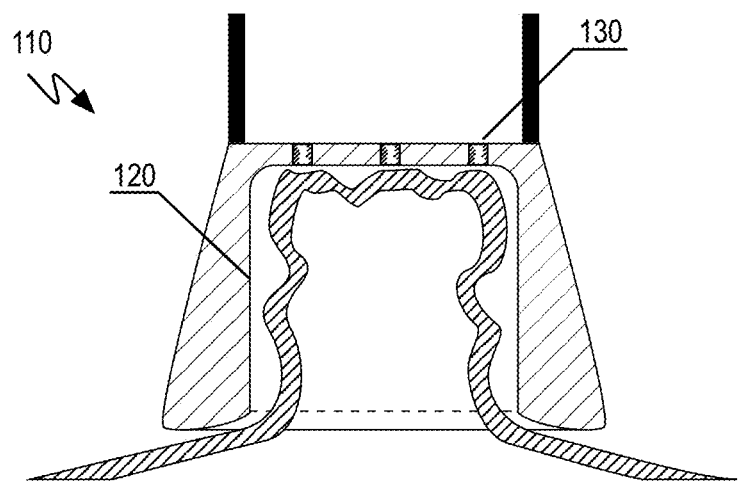

The end effector can function in part by leveraging the rigid (or at semi-rigid) structure with a set of inlets recessed from an inner chamber opening. In this way, when a bagged item is engaged by the end effector, the bag material is pulled into the structure of the inner chamber and thereby into the body of the end effector. As an exemplary description of the sequence of grasping interaction, the end effector can work by having a form such that, when de-pressurized, a bag is initially pulled into an inner chamber through a chamber opening as shown in FIG. 2A. Material of the bag is pulled up towards the top wall of the chamber. Bag material will generally be pulled to each or at least a plurality of these inlets establishing a seal as shown in FIG. 2B. With the bag pulled into the restorative volume of the concave inner chamber, the pressurized seal with the bag may be more resilient.

In a hybrid variation, the end effector naturally grasps an object based on the surface properties of the object. As shown FIG. 3A, a bagged object will have a bag grasped as described above. However, as shown in FIG. 3B, a boxed object (or other types of suitable objects) will engage with and be grasped through the suction cup system of the end effector.

Figure 4A:
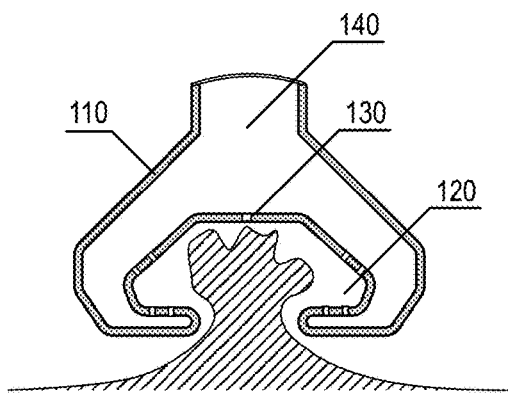
FIGS. 4A-4C are schematic representations of an exemplary sequence of the end effector grasping a bag and holding the bag at different orientations.
Figure 4B:
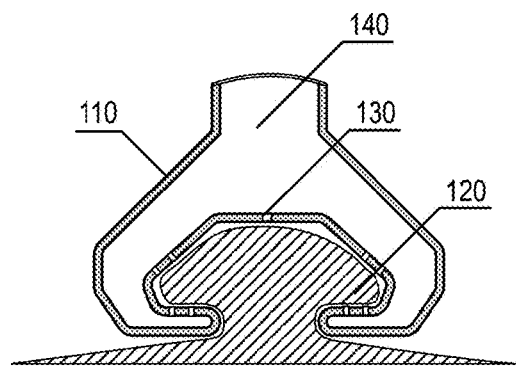
Figure 4C:
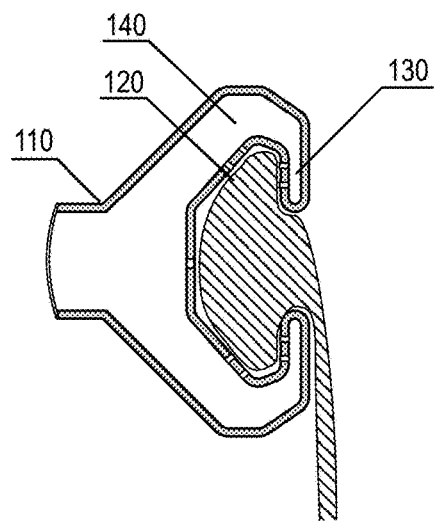

In an exemplary system variation shown in FIGS. 4A-4C, the end effector may include other inlet and structural features to further augment how a bag is pulled into the structure of the chamber and grasped. The body of the end effector may work to mitigate occurrences of slippage or material rolling a bag through the design of the profile of the concave chamber and/or other structural features. As shown in FIG. 4A, when de-pressurized, a bag is initially pulled into an inner chamber through a chamber opening. The friction between the bag membrane and the entrance of the end effector can be low during this phase and the bag membrane is allowed to quickly enter into the inner chamber of the end effector. The arrangement of the inlets may be configured such that material of the bag is pulled up towards the top wall of the chamber, but then inlets along the side of the chamber and optionally the bottom edges of the chamber (possibly on a lip structure) then pull the bag material towards those inlets as shown in FIG. 4B. Bag material will generally be pulled to each or at least a plurality of these inlets establishing a seal because as flow to one of the inlets is blocked by the membrane, flow to the other inlets continues. Because of the enclosed shape of the end-effector chamber (as defined by a central cavity), the bag membrane is wrapped around the entry edge of end-effector and a high-friction contact is initiated between the bag membrane and the end-effector. The arrangement of the inlets can include configuration to promote a desired sequence of engagement with a bag membrane during the initial gripping of the object. As one potential benefit of such end effector features, when the end effector is manipulated (e.g., rotated, torqued, or twirled in space), the edges of the chamber opening, and optionally other structural edges, mitigate opportunities for slippage and bag rolling as shown in FIG. 4C.

The system may provide a number of potential benefits. The system is not limited to always providing such benefits, and they are presented only as exemplary representations for how the system may be put to use. The list of benefits is not intended to be exhaustive and other benefits may additionally or alternatively exist.

As one potential benefit, the end effector device and system may enhance a machine's ability to grip bagged objects. In particular, the end effector device and system can enhance a machine's ability to grip weighted or heavier bagged objects and objects that have been packaged in loose membranes. For example, the end effector may be able to reliably grip loosely bagged items such as a coffee mug inside of a 12"×12" polybag.

As another potential benefit, the end effector device and system may, in some variations, be configured to operate as a hybrid end effector that can be used for grasping non-bagged objects, like boxes, as well as bagged objects. In some variations, the end effector device and system include design features such that the interaction can be such that, when a grasping action is performed, the interaction between the end effector and object naturally adapts so that objects are grasped in an appropriate mode. For example, a boxed object and/or a taut bagged object will naturally engage with an outer suction cup element while a bagged item with a loose membrane will have the bag material naturally pulled into the restorative volume. By selectively engaging with objects based on their physical surface properties, this may allow a pick and place robotic system to manipulate a non-heterogenous assortment of objects.

As another related potential benefit, the end effector device and system may enable machines to better manipulate bagged objects in addition to enhanced grasping. With lower occurrences of grip failure at different angels, machines can manipulate bagged goods in a variety of ways. The increased range of manipulation in combination with fewer instances of grasp failure result in increased efficiency for an automated system. For example, the end effector may be used to not only grasp and translate an object from one position to another, but to optionally also reorient the object.

As another potential benefit, the end effector may have a long usage lifetime. Some variations of the end effector can be made from rigid or semi rigid material that would be resistant to failure. Additionally, some end effector variations may be made from a single piece and/or have no moving pieces increasing the robustness of the device.

As yet another potential benefit, the end effector may work as a passive element using its physical design to better grasp objects. As a passive device, the end effector will not need additional actuators, sensors, and/or control systems as some grasping end effector solutions may require.

2. End Effector Details

As shown in FIG. 1A, the end effector for suction-based grasping of hag wrapped objects can include a main body structure 110 with a defined concave inner chamber 120 including an array of inlets 130. The body structure 110 can include a defined internal channel 140 coupling a vacuum line interface 150 to the array of inlets 130. The end effector can be used with bagged objects, wherein the bagged object may be grasped by pulling the bag material into the concave inner chamber 120, which functions to establish a more resilient grasp of the bagged object.

The end effector is preferably for use with a vacuum pressure system 170, which may be used in combination with a pick and place robotic system, or any suitable automation system. A system variation may include one or more instances of the end effector, a vacuum pressure system, and/or a pick and place robotic system. A vacuum pressure system 170 and more specifically a pressure line connected a vacuum pressure pump connects to the end effector, wherein the pressure line, the internal channel 140, and the array of inlets form a fluidically coupled path for gas and/or a liquid.

Variations of the end effector system may incorporate various features and variations as described herein. FIGS. 1A-1F are exemplary representations of variations of the end effector, but as would be appreciated by one skilled in the art, the end effector is not limited to these exemplary representations. For example, the end effector may incorporate one or more variations described herein.

As described herein, the end effector is most generally described and characterized assuming a substantially horizontally symmetrical and substantially rounded or circular profile unless otherwise noted. However, as would be appreciated by one skilled in the art, the end effector and its variations are not limited to such symmetrical or rounded forms and may be asymmetrical and have other shape profiles.

In one variation of the end effector, such as those shown in FIGS. 1A-1F, the end effector includes an at least semi-rigid body structure 110; where the body structure comprises a defined concave inner chamber 120 with a chamber opening at an object engagement side of the end effector; within the inner chamber, the body including an array of inlets 130 defining channel openings in the walls of the body structure 110. The defined concave inner chamber 120 is recessed beyond the chamber opening, which promotes bag material being pulled into the inner chamber 120 thereby enabling better grasping of a bagged object. In some variations, the body structure further comprises a defined internal channel 140 connecting to the array of inlets 130; and the body structure 110 further comprising a vacuum line interface 150 defining an opening to the defined internal channel 140.

The object engagement region is preferably a face or surface(s) on the body structure 110 in which objects are engaged. The object engagement region may be along a substantially planar region. However, the region can conform to any suitable shape or form. The object engagement region will generally be on a side (i.e., an object engagement side) opposite a vacuum line opening and its respective vacuum line interface 150. However, the vacuum line interface and the object engagement region can have any suitable relative position. For example, some variations may have 45° or 90° angle between the vacuum line interface and the object engagement region.

As described herein, the end effector may be implemented with various shapes of the concave inner chamber 120, arrangement of the array of inlets 130, optional inclusion of a structural lip or other structural features of the concave inner chamber 120, inclusion of a suction cup system 160, and/or other variations.

Figure 3A:
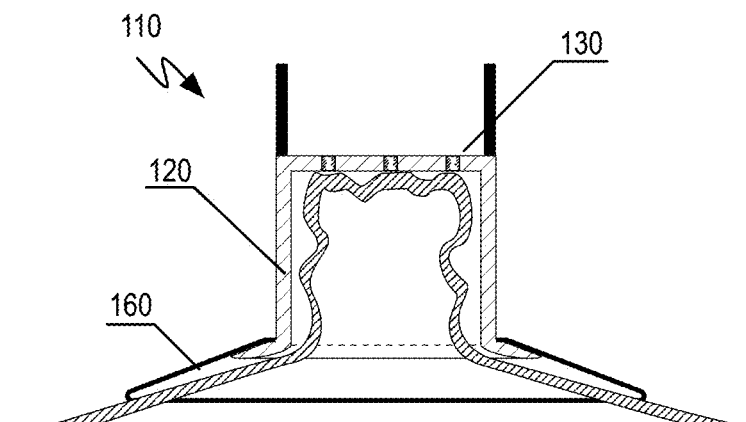
FIGS. 3A and 3B are side cross sectional schematics of bag interactions of a hybrid end effector variation engaging with a bagged object in FIG. 3A and a solid object in FIG. 3B.
Figure 3B:
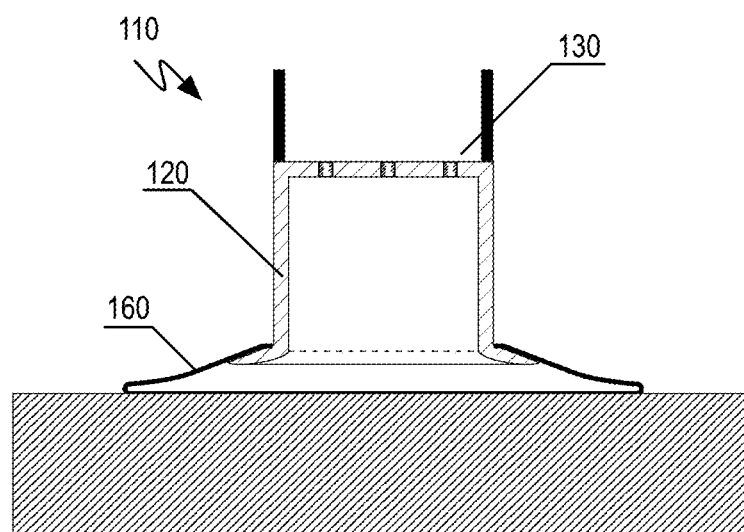

A variation of the end effector including a lip, as shown in FIGS. 3A and 3B, may be more specifically and alternatively described as including a body structure 110 with a vacuum line interface 150 and an object engagement region, the vacuum line interface 150 being configured to couple at least one pressure line of a vacuum pressure system to a defined internal channel 140 of the body structure; the body structure 110 comprising a defined concave inner chamber 120 with a chamber opening at the object engagement region; a lip structure 121 extending from the body structure 120 and at least partially defining the chamber opening to the inner chamber 120; an array of inlets 130 positioned along walls of the inner chamber 120 and a lip internal wall 124 of the lip, wherein each inlet defines an opening in the body structure 110 to the defined internal channel 140.

Figure 5:
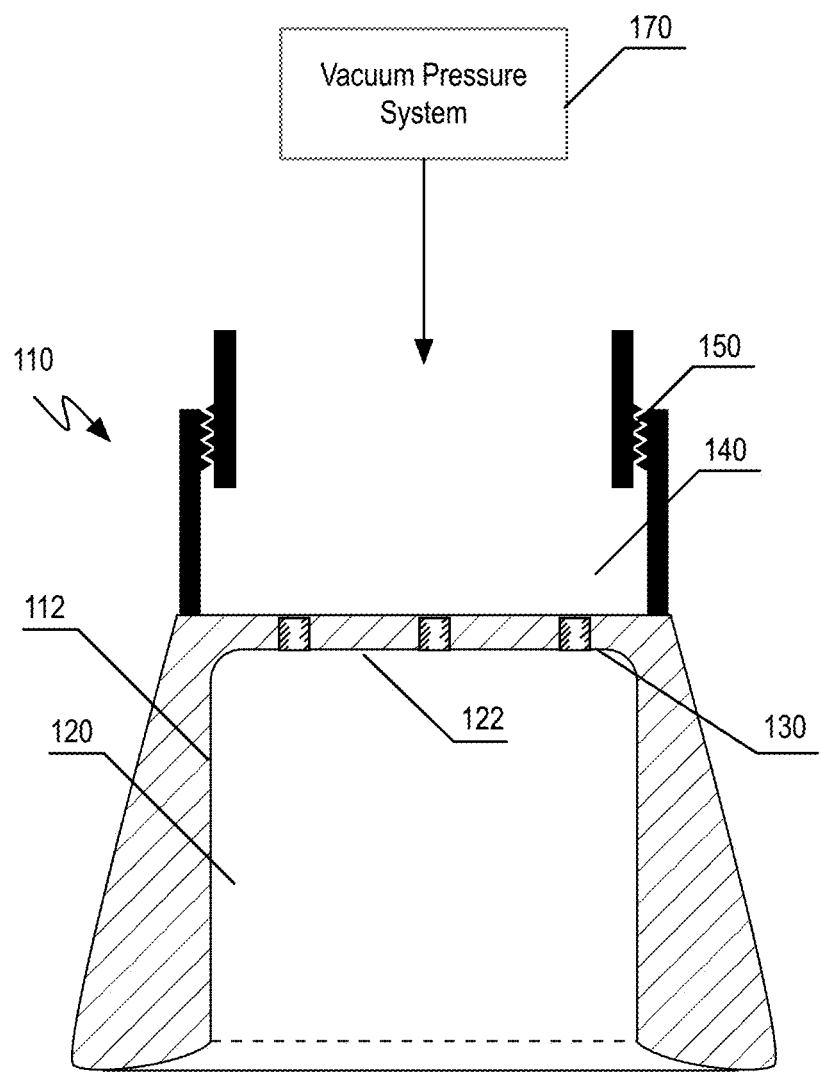
FIG. 5 is a detailed side cross sectional schematic representation of one end effector variation with a concave inner chamber.

As a first set of variations, the end effector may apply various arrangements of inlets 130 within the concave inner chamber 120. The array of inlets may include at least a subset of inlets 1301 positioned along a wall of the internal structure that is opposite the defined chamber opening (e.g., the wall across from the chamber opening) as shown in FIG. 5 may alternatively or additionally be placed along side wall, a lower wall, and/or a structural feature of the concave inner chamber.

Figure 6:
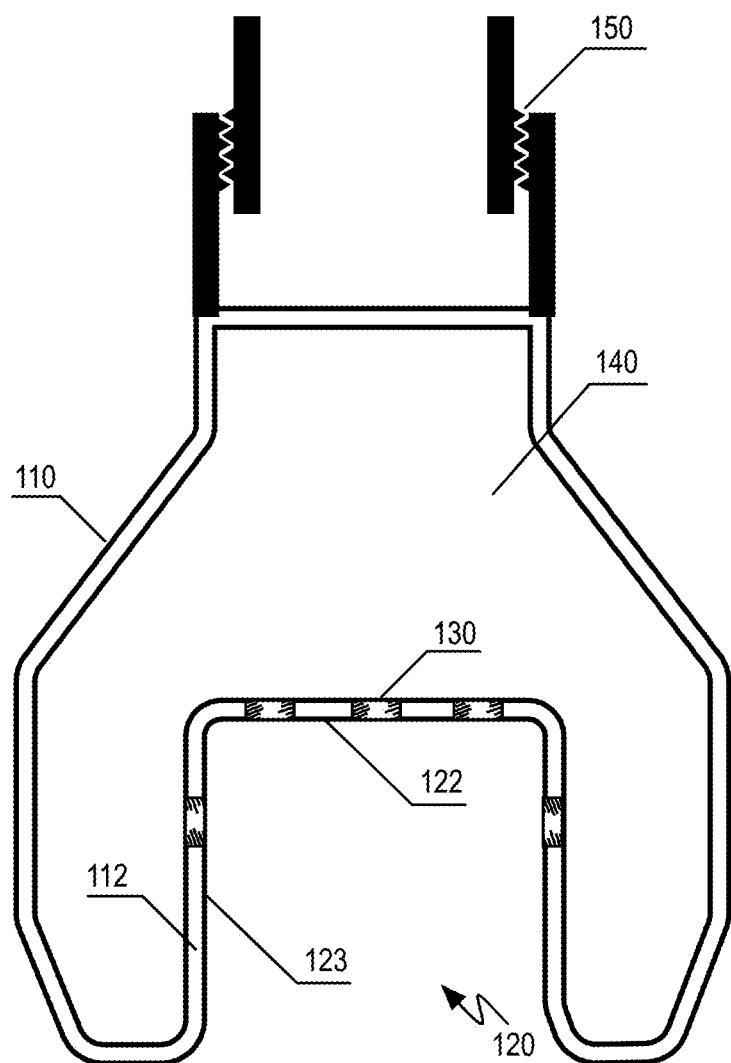
FIG. 6 is a detailed side cross sectional schematic representation of an alternative end effector variation with a solid body and inlets on different walls.
Figure 7:
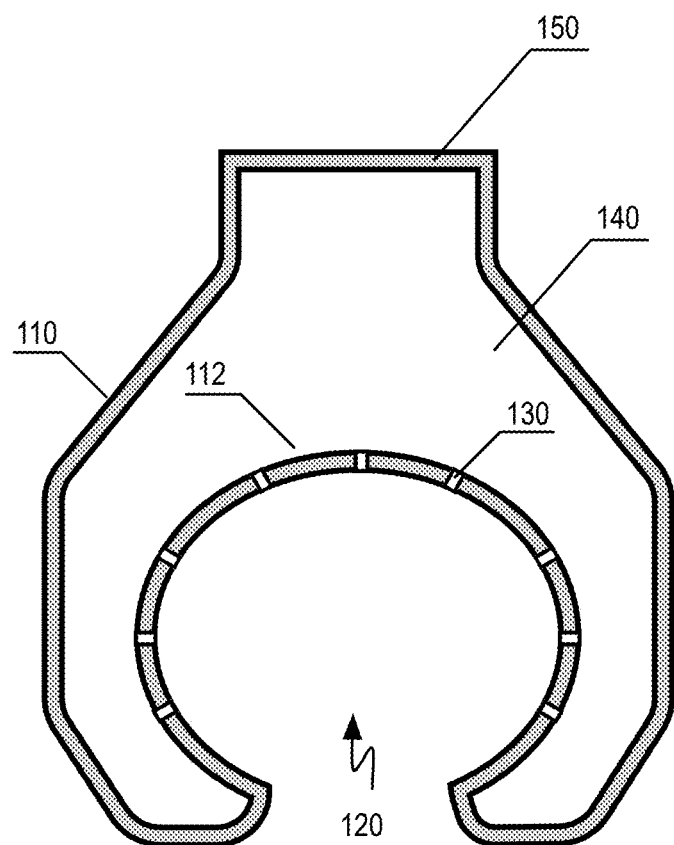
FIG. 7 is a side cross sectional schematic representation of one variation of the end effector with inlets along the internal surface of an internal structure.

The array of inlets may include inlets placed at a variety of orientations along different walls or structures of an internal structure defining the concave inner chamber. Accordingly, the array of inlets may include at least a second subset of inlets along a second wall of the concave inner chamber, wherein the second subset of inlets are defined at an orientation different from an orientation of a first subset of inlets. As shown in the example of FIG. 6, a first set of inlets can be placed along a top wall and a second set of inlets can be placed along a side wall.

As another set of variations, the end effector may apply incorporate an expanded concave inner chamber 120 to augment the restorative volume used in gripping a bagged object. An expanded concave inner chamber is an inner chamber with a width greater than a width of the chamber opening. In variations with an expanded inner chamber 120, the inner chamber having an internal width greater than the chamber opening can promote the bag material being pulled into the inner chamber 120 where the chamber opening establishes a rigid barrier forming a folding of the bag material, which may mitigate slippage and bag rolling so as to better grasp the bagged object. In a concave inner chamber with a circular cross section, this may mean the concave inner chamber has a cross section with a diameter greater than a diameter of the chamber opening. The inner chamber and/or the chamber opening are not limited to circular forms, however. In this way, an expanded concave inner chamber 120 may be any with a profile that, in at least one region, recedes beyond the inner chamber opening (e.g., being concave in a horizontal dimension).

Figure 8:
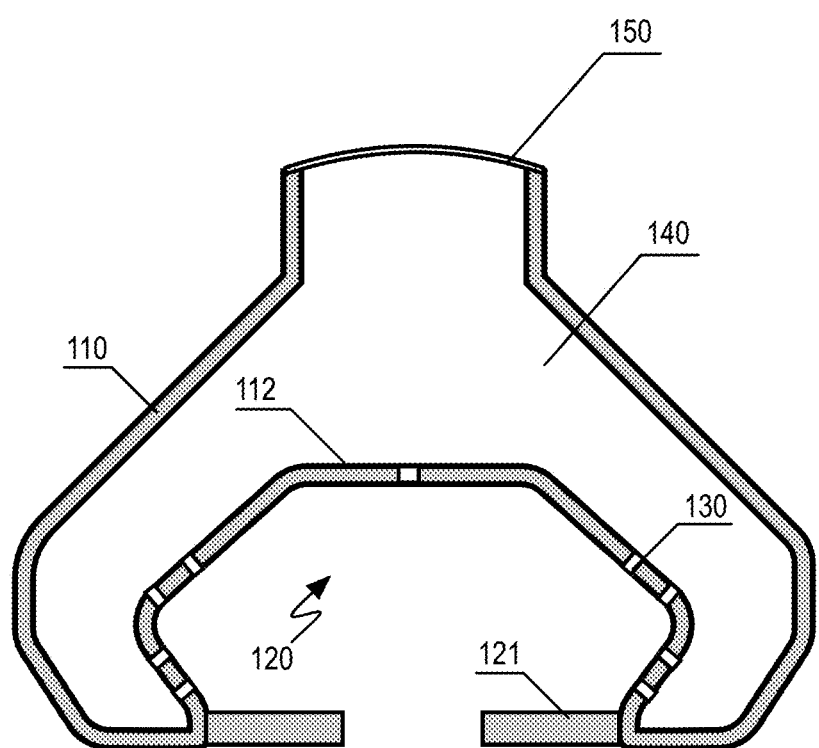
FIG. 8 is a side cross sectional schematic representation showing features of the end effector for one variation of the end effector with a lip structure.
Figure 9:
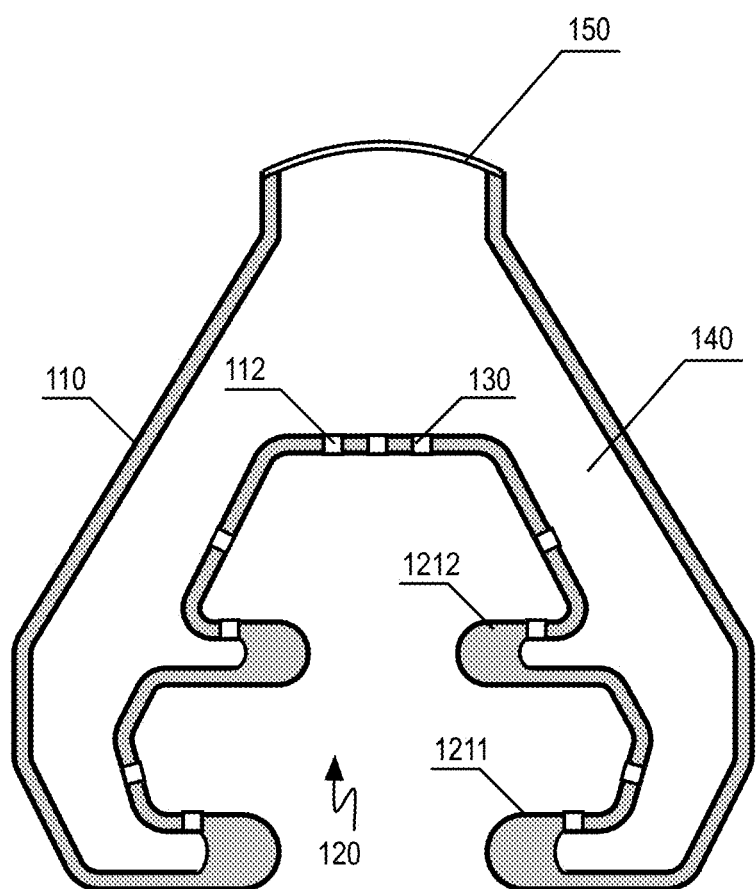
FIG. 9 is a side cross sectional schematic representation of a variation of the end effector with an internal lip feature.

As another possible variation, the expanded inner chamber may incorporate a lip structure 121 extending inward from the body structure 110 on the object engagement side to at least partially define the chamber opening as shown in FIG. 8. In some variations, the lip structure 121 extends inward from the body structure to define a rounded chamber opening. The lip structure 121 may alternatively form any suitably shape profile of a chamber opening. There may additionally be multiple lip structures such as an external lip 1211 and an internal lip 1212 as shown in FIG. 9.

Figure 10A:
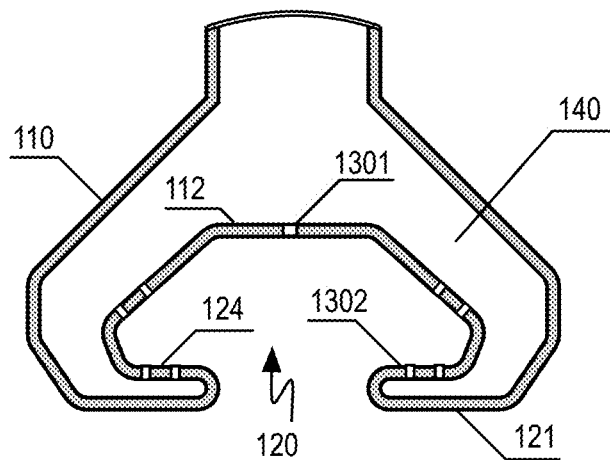
FIG. 10A is a side cross sectional schematic representation of one variation of the end effector with a lip.
Figure 10B:
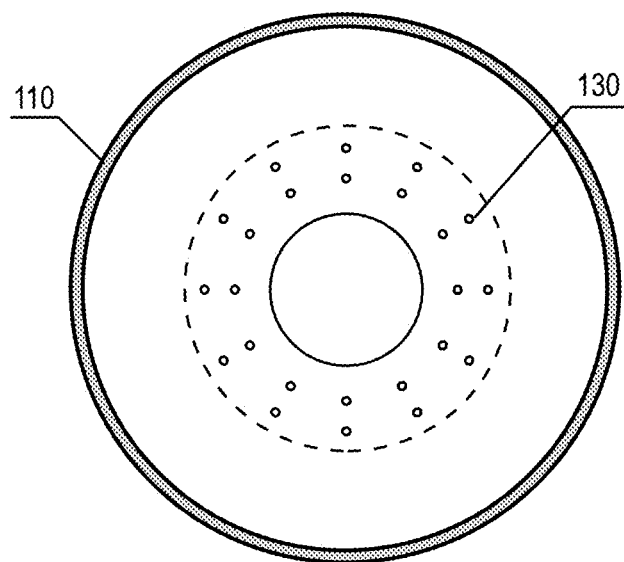
FIG. 10B is a horizontal cross sectional schematic representation illustrating the inlet pattern on the lip of one variation of the end effector.

As another possible variation, a subset of inlets 130 may be positioned on the lip structure 121 and open in a direction away from the chamber opening as shown in FIG. 10. In one example, the array of inlets 130 can have at least a first subset of inlets 1301 opening in the direction of the chamber opening and a second subset of inlets 1302 (e.g., inlets on the lip structure) opening in a direction away from the chamber opening as shown in FIG. 10. In a variation that includes a lip structure 121, a subset of the inlets 130 may be positioned on the lip structure 121, and more specifically a lip internal wall wherein the inlets 130 open in a direction away from the chamber opening. The multi-directional positioning of inlets within the inner chamber, combined with a lip extending inward can create a volume with multi-directional pressure forces that can hold a bag in a more secure way. The physical form of the body structure 110 can cooperatively reinforce the grip of an object and mitigate opportunities for bag specific grasp failures.

Figure 12:
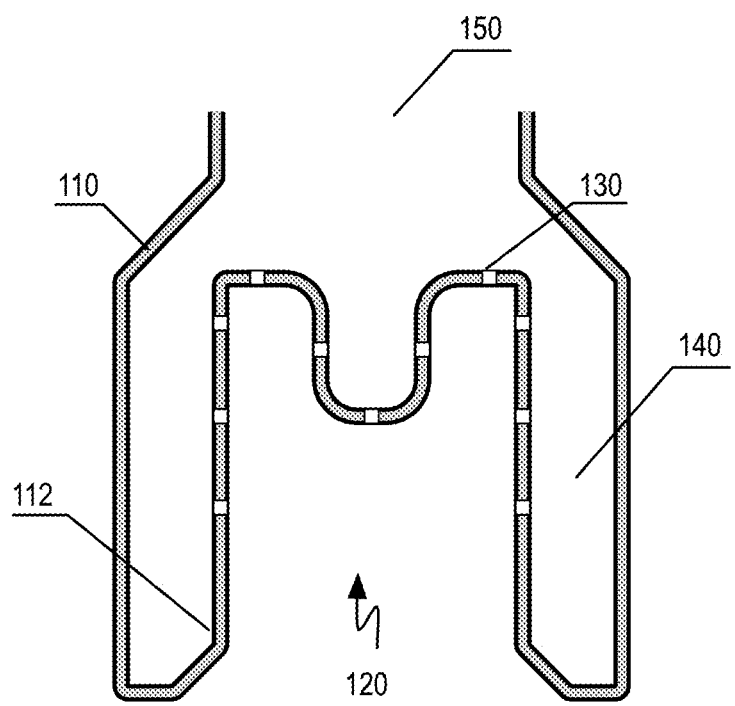
FIG. 12 is a side cross sectional schematic representation of one variation of the end effector with a downward protruding structure feature.

As another possible variation, the internal structure defining the concave inner chamber 120 may include one or more structural features (e.g., lips protrusions, troughs, etc.). In the examples of FIGS. 11A and 11B, crenelated structural features may be patterned on side walls of the sides of the internal structure defining the concave inner chamber 120. In the example of FIG. 12, structural features may include a protruding surface from a top wall of the internal structure defining the concave inner chamber 120. In such variations, a subset of inlets may be positioned on one or more structural features.

As one possible variation, end effector features such as those described herein may be incorporated into an end effector with an expanded concave inner chamber 120 and one with a body structure 110 defining an outer surface. In such variations, the end effector may be a fully rigid (or semi-rigid) structure, which may be made of a single piece or alternatively multiple components attached to form the structures of the end effector. In some variations, this variation may be manufactured using additive manufacturing (e.g., 3D printing) or other manufacturing techniques. In other variations, multiple components may be manufactured, attached, and assembled to form the single solid component. This variation may be used as a hag-focused end effector.

In such bag-focused variation, the end effector can include an at least semi-rigid body structure 110; where the body structure forms an external surface of the end effector and comprises a defined concave inner chamber 120 with a chamber opening at an object engagement side of the end effector, and wherein the inner chamber 120 has an internal width greater than the chamber opening; within the inner chamber, the body including an array of inlets defining channel openings in the walls of the body structure; the body structure further comprising a defined internal channel connecting to the array of inlets; and the body structure further comprising a vacuum line interface defining an opening to the defined internal channel.

As another possible variation, the end effector may include a body structure 110 that includes or is connected to a suction cup system 160 integrated with an internal structure defining a concave inner chamber 120 such as shown in examples FIGS. 13-17. Such variations, alternatively referred to as hybrid end effector variations, may function to enable the end effector to act as a suction cup based end effector or as a bag-focused end effector. In a hybrid variation with an integrated suction cup, boxed objects (or other objects with surfaces suitable for suction cup grasping such as loosely bagged items) may be naturally grasped by establishing a vacuum seal between the suction cup system 160 and the surface of the object; and a bagged object will naturally have bag material being pulled into the inner chamber 120 for grasping of the bagged object. The hybrid end effector variations may optionally include one or more of the feature variations described herein.

In this manner, a hybrid end effector for a pick-and-place system may include: a body structure 110 with a vacuum line opening and an object engagement region, the vacuum line interface 150 (e.g., an opening) being configured to couple at least one pressure line of a vacuum pressure system to a defined internal channel of the body structure 110; the body structure 110 comprising a suction cup system 160 that comprises a flexible sealing lip 161 at the object engagement region; the body structure 110 additionally comprising an internal structure 112 defining a concave inner chamber 120 with a chamber opening at the object engagement region, the chamber opening being positioned within a grasping region of the sealing lip 161; and the internal structure 112 comprising an array of inlets 130 positioned along at least one wall of the concave inner chamber 120, wherein each inlet defines an opening in the body to the defined internal channel.

In some variations, this end effector variation may include a suction cup system forming an external surface of the end effector (e.g., the external surface of the body structure 110); and a separate rigid internal structure inserted within an opening in the suction cup system 160. The suction cup system 160 can be made of a flexible material, and the internal structure 112 can be made of a rigid material (or semi-rigid material). The rigid internal structure may be fitted and/or attached within the suction cup system. The rigid internal structure 112 can define the concave inner chamber 120 with a chamber opening at an object engagement side of the end effector. As with other variations, within the inner chamber 120, the internal structure 112 can include the array of inlets 130 defining channel openings in the walls of the internal structure 112.

Figure 14A:
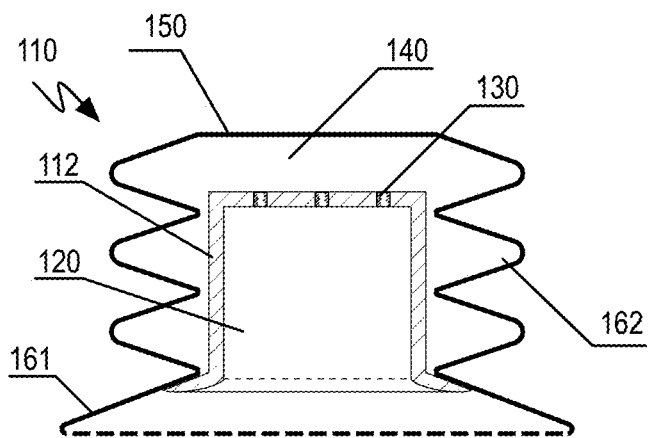
FIG. 14A is a side cross sectional schematic representation of one variation of a hybrid end effector with a sealing lip and bellows.
Figure 14B:
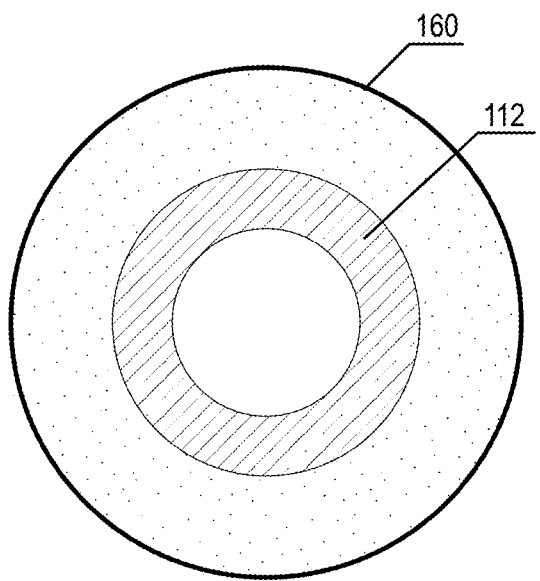
FIG. 14B is a horizontal cross sectional schematic representation illustrating the sealing lip extending outward from the chamber opening.
Figure 15A:
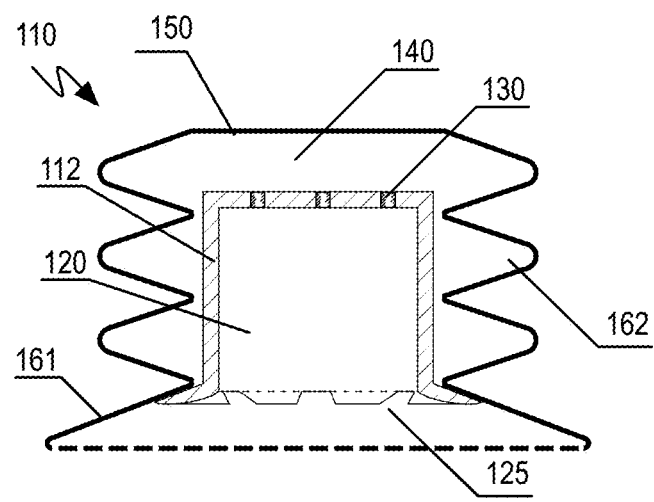
FIG. 15A is a side cross sectional schematic representation of one variation of a hybrid end effector with a transitional air channels.
Figure 15B:
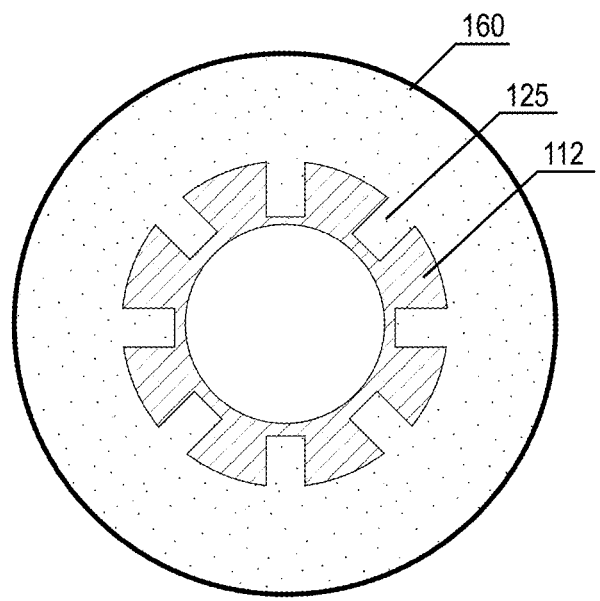
FIG. 15B is a horizontal cross sectional schematic representation illustrating an exemplary patterning of transitional air channels.

The sealing lip 161 preferably surrounds and extends outward from the chamber opening. The suction cup system 160 of the body structure 110 may additionally include bellows 162 around the internal structure 112 and forming an external surface of the end effector such as shown in FIG. 14. The bellows 162 may be connected to the sealing lip 161.

Figure 13A:
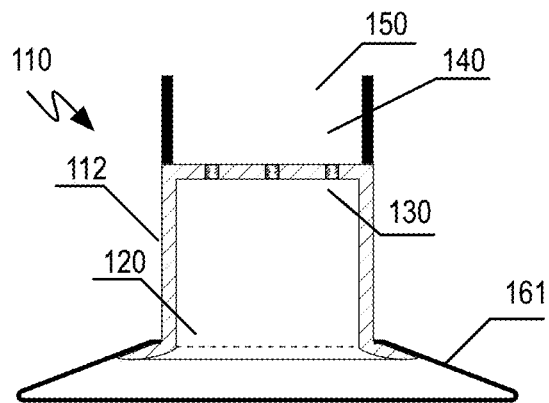
FIG. 13A is a side cross sectional schematic representation of one variation of a hybrid end effector with a sealing lip.
Figure 13B:
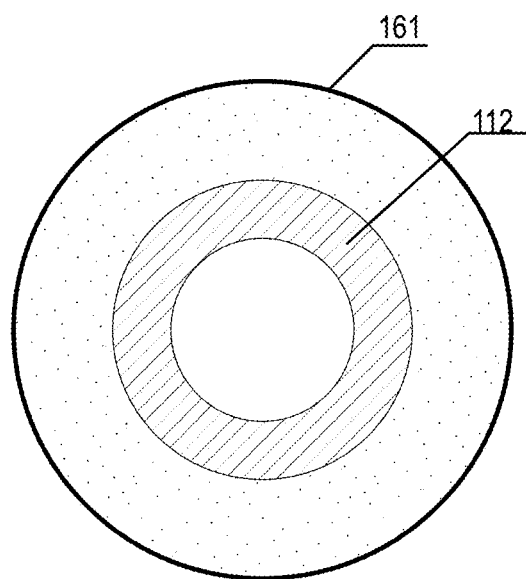
FIG. 13B is a horizontal cross sectional schematic representation illustrating the sealing lip extending outward from the chamber opening.

In some hybrid variations, such as those shown in examples FIGS. 13-14, the array of inlets can include a first subset of inlets positioned along a wall of the internal structure that is opposite the defined chamber opening. In other words, at least a subset of inlets may be along a top wall.

Figure 16A:
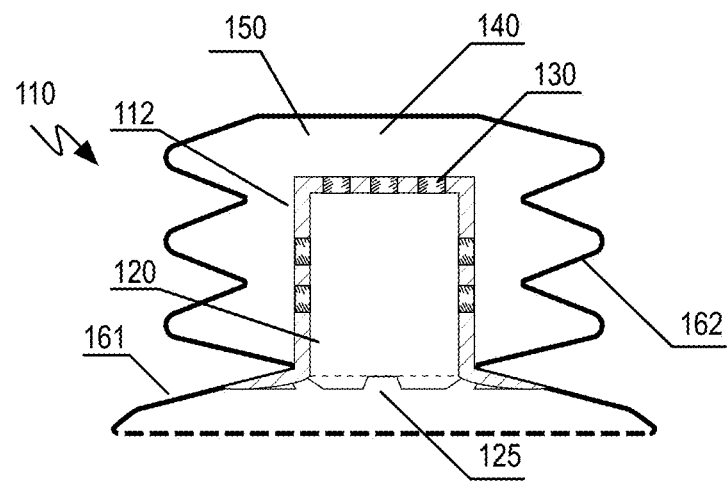
FIG. 16A is a side cross sectional schematic representation of one variation of a hybrid end effector with inlets on differing walls of the internal structure.
Figure 16B:
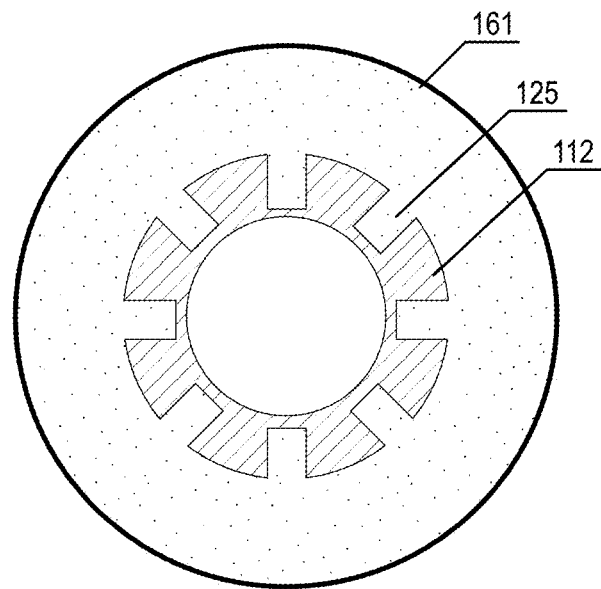
FIG. 16B is a horizontal cross sectional schematic representation of the hybrid end effector with inlets on differing walls of the internal structure.

In some hybrid variations, such as the variation shown in FIG. 16, the array of inlets may additionally include at least a second subset of inlets along a second wall of the concave inner chamber. The second subset of inlets may be defined at an orientation different from an orientation of the first subset of inlets. In such variations, inlets may be defined along different walls that have a defined tangent along non-parallel planes. As shown in the example of FIG. 16, inlets may be positioned along a top wall and side walls of the concave inner chamber.

Figure 17A:
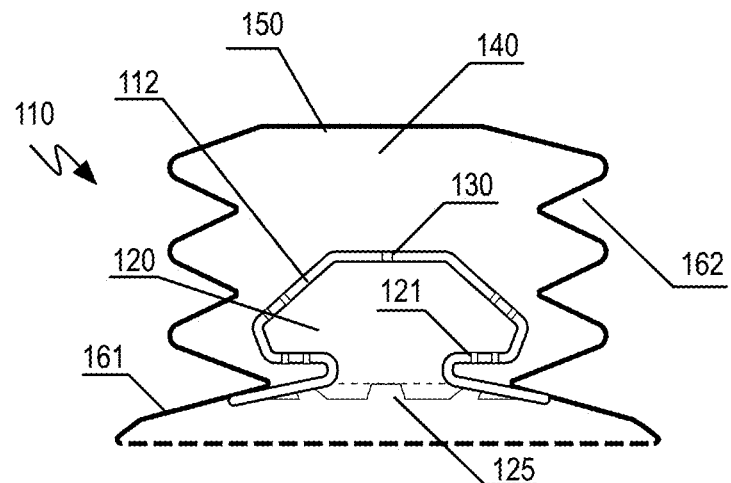
FIG. 17A is a side cross sectional schematic representation of one variation of a hybrid end effector with an expanded concave inner chamber.
Figure 17B:
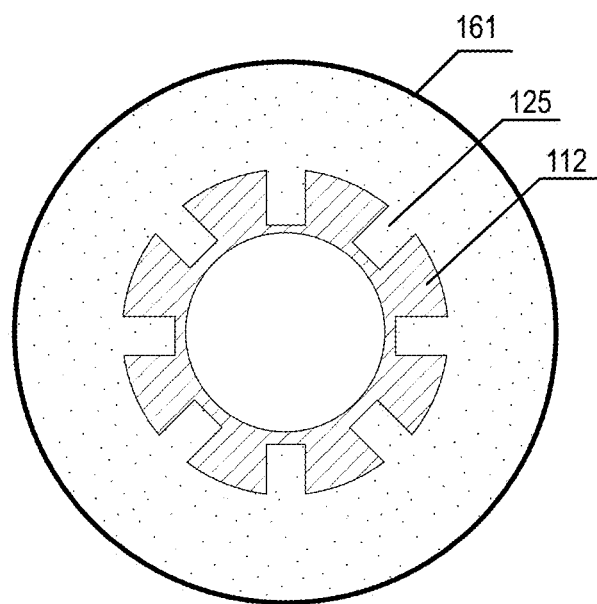
FIG. 17B is a horizontal cross sectional schematic representation of a hybrid end effector with an expanded concave inner chamber.

In some hybrid variations, such as the variation shown in FIG. 17, some inlets 130 may be oriented in opposing directions. The inlets 130 may be oriented in directly opposing directions (with the inlets defined along vectors in opposite directions), but the inlets 130 may alternatively be oriented in indirectly opposing directions (with the orientation vectors of two inlets having longitudinal components in opposite directions).

Figure 18A:
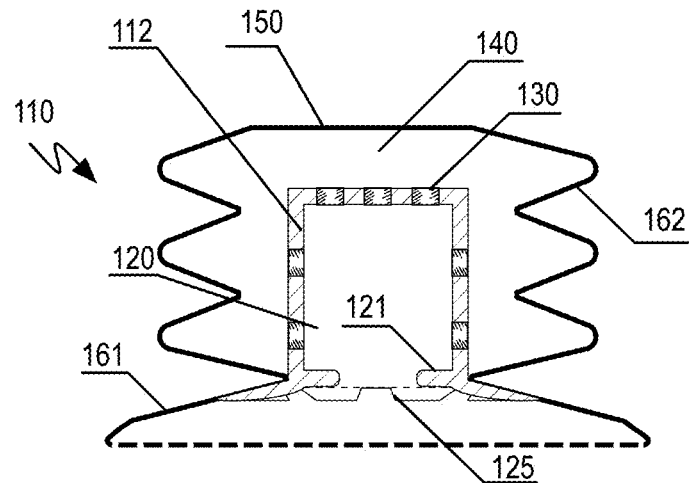
FIG. 18A is a side cross sectional schematic representation of one variation of a hybrid end effector with a lip structure.
Figure 18B:
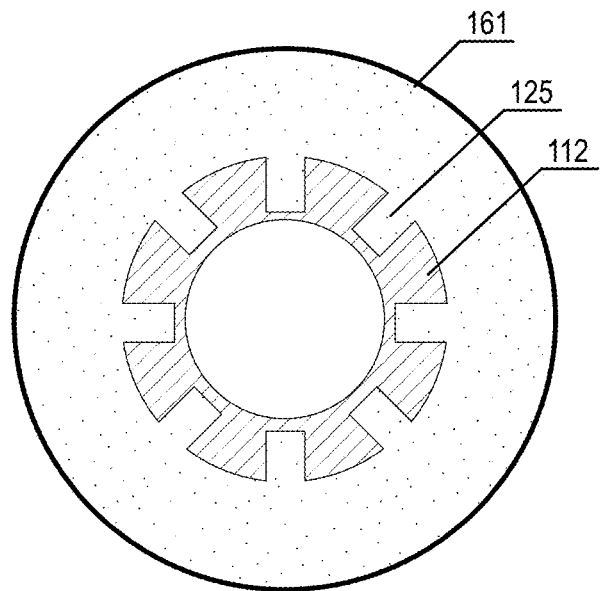
FIG. 18B is a horizontal cross sectional schematic representation of a hybrid end effector with a lip structure.

In some hybrid variations, such as the variation shown in FIG. 18, the internal structure may form an expanded concave inner chamber 120 with an inner chamber with a width greater than a width of the chamber opening. In some such variations, the internal structure (or other suitable component of the end effector) may include a lip structure 121 at least partially defining the chamber opening.

Additionally, in some hybrid variations, such as the variation shown in FIG. 17, a first subset of inlets 130 may open (i.e., be defined with an orientation) in a direction of the chamber opening and a second subset of inlets are positioned on the lip structure and open in a direction away from the chamber opening (i.e., in opposing directions).

Figure 19:
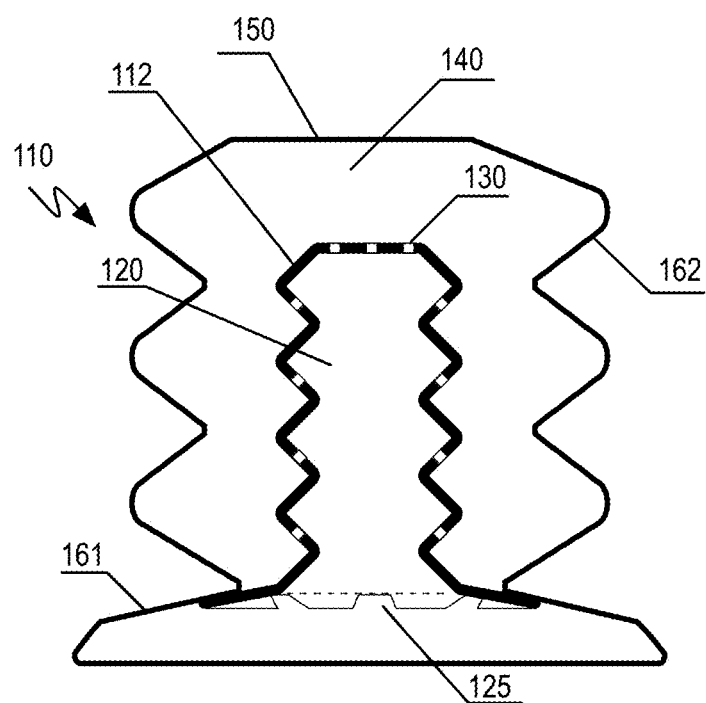
FIG. 19 is a side cross sectional schematic representation of one variation of a hybrid end effector with structural features in the inner chamber.

In some hybrid variations, such as the variation shown in FIG. 19, the internal structure 112 defining the concave inner chamber 120 may include one or more structural features (e.g., lips protrusions, troughs, etc.).

In some hybrid variations, such as the variations shown in FIGS. 15-18, the end effector includes transitional air channels 125 between the chamber opening and the suction cup 160. Each transitional air channel 125 may extend from an inner edge of the chamber outward toward an outer edge of the sealing lip 161. This functions to provide a fluidic channel improve hybrid operation in either a suction cup gripping mode or a bagged object gripping mode. Other structural arrangements may be used to establish transitional air channels. In one preferred implementation, the internal structure includes a set of flanges extending outward from the chamber opening thereby forming a set of transitional air channels when inserted into the central opening in the suction cup system. The set of flanges preferably extend in an at least partially horizontal direction, and preferably conform to a slope and surface of the sealing lip 161. Alternatively, the transitional air channels may be defined by the form of the inner surface of the sealing lip 161.

Figure 20A:
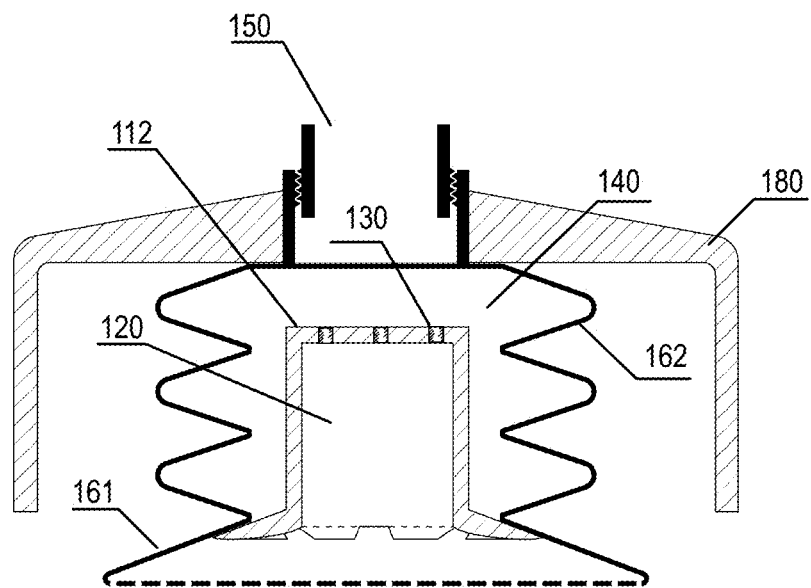
FIG. 20A is a side cross sectional schematic representation of one variation of a hybrid end effector with a rigid shroud.
Figure 20B:
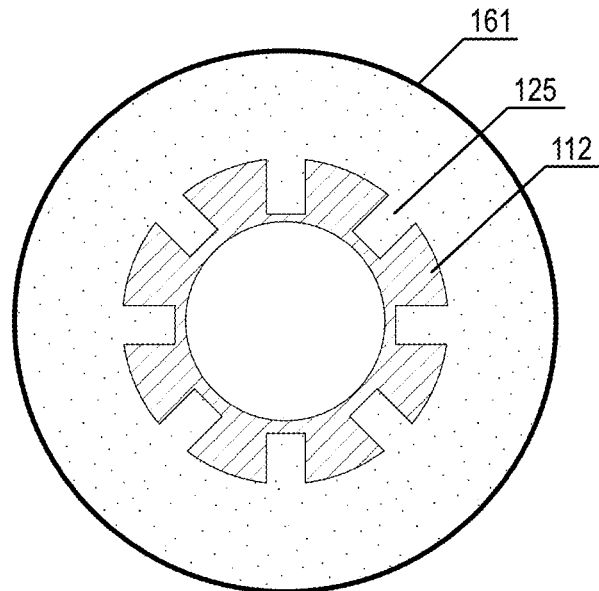
FIG. 20B is a horizontal cross sectional schematic representation of a hybrid end effector with a rigid shroud.

In some hybrid variations, such as the variation shown in FIGS. 20, the end effector that includes a suction cup system 160 with bellows 162 can include a rigid shroud 180 enclosing the bellows.

Below follows detailed description of various components, features, and variations of the end effector and/or an end effector system.

The body 110 of the end effector, functions as the structural unit with various channel features to enable the end effector described herein. The body 110 may be made of multiple components that are assembled or otherwise connected to form the end effector. The body 110 may alternatively be made of a single manufactured structure.

As described above and show in examples such as FIGS. 5-12, the body 110 can be a rigid or semi-rigid part forming at least a part of an external surface and the internal structure defining the concave inner chamber 120. In other variations and shown in examples such as FIG. 13-21, the body 110 may include or be integrated with a suction cup system 160 and a rigid or semi-rigid internal structure component. In some hybrid variations, the external surface may be at least partially made of the suction cup system as shown in FIGS. 16-19 for example.

The body 110 preferably includes an internal structure 112 that defines the concave inner chamber 120 and its features as described below. The internal structure may be just a sub-section of a rigid element (e.g., as in FIGS. 5-12). The internal structure may alternatively be a distinct part that is combined with other components to form the body 110 of the end effector. For example, the internal structure 112 could be an insert that is attached within an internal opening of a suction up system 160.

The internal structure 112 is preferably at least semi-rigid. In some variations, the body 110 can be fully made from a rigid or semi-rigid material. As a rigid or semi rigid material, the end effector may have a long lifetime since usage has minimal impact on the structure and functionality of the end effector. The body 110 could be manufactured single piece of material, but could alternatively be a multi-part design. Some variations may implement an end effector with flexible or non-rigid materials and elements into the body. As one exemplary variation, the end effector could include flexible bellows for more flexibility if and when contacting objects, and the flexible region could be integrated into the body 110.

Various structural body 110 variations for various elements of the end effector are described in more detail herein.

In general, the structural body 110 will include at least some portion or subcomponents that defines a concave inner chamber 120.

As shown in the examples of FIGS. 13-20, the structural body 110 may include a semi-rigid component forming the inner chamber 120 to promote grasping of bagged objects and an outer suction cup system 160 that promotes grasping of non-bagged objects (e.g., boxed objects) and/or tightly bagged objects.

As shown in FIGS. 5-12, the structural body 110 may alternatively be a fully semi-rigid or rigid structure made of one or more components without a suction cup 160 component. As one example, the body 110 may have a bell-like shape, but the outer-form of the body of the end effector may be customized to any suitable shape. In one preferred implementation, the body 110 is a substantially symmetrical form about a central axis where the vacuum line interface 150 and an inlet into the defined internal channel 140 are on opposing sides. In one implementation, the body 110 has a form compatible for 3D printing such that the end effector can be made from a single piece. However, any suitable manufacturing and assembly technique may alternatively be used.

In some variations, the structural body 110 may include an outer flexible bellow subcomponent 161 to allow the end effector to flex but without including suction cup flanges.

The concave inner chamber 120 functions in cooperation with the array of inlets 130 as a feature facilitating enhanced grasping of a bag. As described above, the concave inner chamber 120 is defined by an internal structure 112 and so features of the inner chamber 120 may alternatively be described as features of the internal structure 112 or defined by the internal structure 112.

When a pressure force is active, a hag can be pulled into the inner chamber 120 and the defined volume of the chamber 120 is shaped to allow sufficient bag material to enter so that a seal can be established on substantially the entire array of inlets 130. The plurality of inlets 130 at different positions can establish different points of exerted force. In variations with inlets at different orientations, the bag can be pulled in different directions at distinct locations of the inlets 130.

As discussed in some instances, the direction of force generated from the pressure force exerted from one or more inlets 130 in a particular region may be in a direction opposing the direction in which the bag entered the chamber opening, thus increasing the friction between the bag membrane and the walls of the chamber opening and resisting slip when moving the object in space while gripping. This functions to make the structure of the end effector act in manner like a folding clasp.

The concave inner chamber 120 is formed by an internal structure 121 of the body structure 110. In some variations, the internal structure 121 may be just part of the body structure 110 that forms the end effector, such as in FIG. 6 for example. Alternatively, the internal structure 121 may be a distinct component connected to another component of the body structure 110. In one example, the internal structure 121 is an insert positioned within the opening of a suction cup system 160. Reference to the inner chamber 120 can refer to the defined cavity formed by the internal structure 121.

The inner chamber 120 is preferably concave from the chamber opening. In other words, the inner chamber is a defined cavity that is concave in the longitudinal direction (recessed from the distal chamber opening and toward the proximal end of the end effector). The inner chamber 120 is primarily described herein as having a rounded or circular chamber opening in an object engagement region. The chamber opening however may have alternative shapes.

In some variations, the inner chamber 120 is an expanded concave inner chamber where the inner chamber 120 at its widest region has a width greater than a width of the chamber opening. In a more general characterization, the width of one section of the cavity is greater than at least one section of the cavity that is closer to the opening. The inner chamber 120 can be domed shaped, but may have a variety of internal geometries. The inner chamber 120 may have a defined volume with a non-regular form.

The inner chamber 120 is made up of internal walls, which may include top internal walls 122 and side internal walls 123. In some variations, the inner chamber 120 may additionally include a lip internal wall 124 when the end effector includes a lip structure 121. In some variations, the end effector may have no clear distinctions of such internal walls and may be a continuous surface. In other variations, more complex forms may have other internal structural features in the inner chamber 120 where alternative wall descriptors may be used. Reference to the top, side, and lip internal walls is made herein as a convenience for describing various properties and general placement of features, and is not intended to limit the inner chamber to three distinct types of walls.

The top internal wall 122 will generally be characterized as the wall opposite the opening (i.e., chamber opening) in the inner chamber 120. The side internal walls can be characterized as the walls extending longitudinally from the top internal wall 122 toward the chamber opening. In variations including a lip 121, the side internal walls 123 will generally taper or expand outward to the base of the lip internal wall 124.

The inner chamber and its internal walls define a concave cavity that functions to pull in a bag and grip the bag. In an expanded concave variation of the inner chamber 120, the inner chamber defines a concave cavity that may be characterized as including a chamber opening cavity and a central cavity, wherein the width of the chamber opening cavity is narrower in at least one section than at least one region of the central cavity. A lip 121 extending inward can function to define the chamber opening cavity.

The dimensions of the body and the inner chamber 120, as shown in FIG. 4, can be customized for different bag materials and/or sizes/weights of objects. The weight of the object, the type of bag material, the amount of slack in the bag material, and/or other factors can enter into the structure of the inner chamber 120. In one variation, an average width of the chamber opening is greater than the height (i.e., depth) of the concave inner chamber. In the case of a circular chamber opening, this may be alternatively be described as: the ratio of the chamber opening diameter compared to a height of the inner chamber having a ratio greater than one (i.e., the diameter is greater than the height). Here, height refers to the measurement in the longitudinal direction, where chamber height is the height from the object engagement region to a wall of the concave inner chamber opposing the object engagement region. The height and width of the inner chamber can depend on the membrane, thickness of the bag, and the weight of the object within.

The chamber height as defined from the chamber opening to the top wall is preferably sufficiently high to pull in sufficient amounts of material. The opening width (i.e., the width of the chamber opening) is the defined opening in the horizontal direction. The opening width is preferably sufficiently wide to allow the bag material to be pulled into the chamber without overly filling the chamber opening such that the pressure force stretches the bag material. In general the chamber height is greater than the chamber opening, but it is not limited to that configuration. The chamber width (width within the defined central cavity) may vary in profile at different cross sectional regions along the height of the end effector. In an expanded concave inner chamber 120, the inner chamber 120 may generally have a maximum width greater than the chamber opening width as discussed. However, there may be variations where the inner chamber is not centered about a central axis where features of an expanded concave inner chamber 120 can be achieved through alternative configuration. Height, width, longitudinal, horizontal, and/or other relative terms used to refer to measurements and directions are based on references shown in FIGS. 21A and 21B. One skilled in the art will appreciate that these relative terms are only for convenience of description and do not limit the end effector any particular form or orientation.

In some variations, the inner chamber 120 may have no defined lip 121. In one such example, the inner chamber 120 may be a substantially cylindrically shaped defined cavity extending from the chamber opening towards the top wall as shown in FIG. 13.

In some variations, the internal structure 112 may include structural features that function in a similar or complimentary manner to the lip structure 121. Such structural features may involve the internal structure 112 having structural forms extending inward or outward in the inner chamber 120. For example, the side internal walls 123 may serve or function in a similar manner to the lip 121. As shown in FIGS. 11A and 11B, in some alternative variations, the inner chamber 120 may include side internal walls 123 with a patterned surface. The pattern surface can be a sequence of protrusions. The patterned surface structures can be an alternative type of internal lip structure. Inlets may be positioned in valleys between the protrusions.

As another alternative example, the top wall may have an inward protrusion extending downward as shown in FIG. 12. Such structural features can be used to alter the performance of the end effector. For example, the downward protrusion may function expand the surface area of the bag material in which the end effector may grasp.

As discussed, in one preferred variation, the body structure 110 includes a lip structure 121 that extends and protrudes inward across an opening of the inner chamber 120. The lip structure 121 can function as a rim to the chamber opening. Accordingly, the lip structure 121 can partially define the volume of the internal chamber. The lip structure 121 preferably extends from a bottom face of the body structure 110.

As one variation, the lip structure 121 can extend inward from the body structure to define a rounded chamber opening. The lip structure 121 preferably forms a circular, elliptical, or other type of symmetrical rounded shape for the chamber opening. However, the lip structure 121 may be used to make any suitable shape of chamber opening. The lip structure 121 may extend uniformly from all sides of the body structure 110. The lip structure 121 may alternatively not extend uniformly.

Figure 22A:
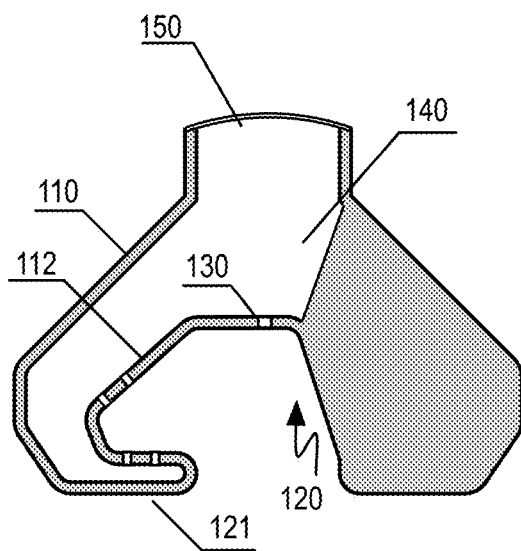
FIG. 22A is a side cross sectional schematic representation of one variation of the end effector with a lip over a limited portion of the chamber opening.
Figure 22B:
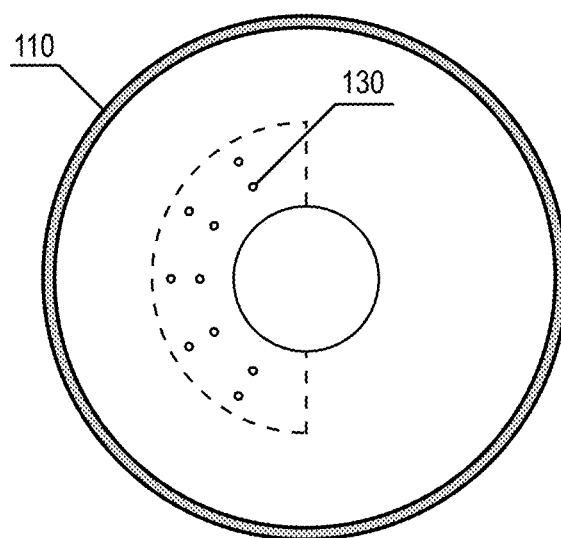
FIG. 22B is a horizontal cross sectional schematic representation illustrating the inlet pattern on the lip of one variation with a lip over a limited portion of the chamber opening.

In one variation, the lip structure 121 extends inward from a limited portion of the body structure 110 to define a lip structure 121 covering over only a portion of the chamber opening. In one implementation, the lip structure 121 extends inward from a half of the circumference of the body structure 110 so as to form a lip structure 121 over only a limited portion of the chamber opening as shown in FIGS. 22A and 22B. This variation may have enhanced gripping along one dimension. The actuation system used in manipulating the end effector may include an encoder or other way of monitoring end effector orientation such that it can appropriately orient the end effector with the lip in an appropriate direction. This may have particular utility in applications with highly repetitive automated systems where a fixed or consistent form of manipulation path is performed repeatedly and where the orientation of the lip can be integrated into the manipulation path.

The lip structure 121 preferably includes a lip internal wall 124. In some variations, the lip internal wall 124 may include at least a subset of the array of inlets 130. The inlets on the lip can be positioned across the surface of the lip internal wall 124. Accordingly, the lip structure 121 can include an internal channel to couple the inlets on the lip to the internal channel 140 of the body. In one variation, the internal channel 140 of the body extends into the lip structure 121, such as when the body 110 and the lip structure 121 are a single or integrated piece. In a variation, where the lip structure 121 is a separate part attached to the body 110, the lip structure 121 may be manufactured with an internal channel that couples inlets of the lip structure 121 to the internal channel 140 of the body when the lip structure 121 is attached to the body 110.

In alternative variations, the lip structure 121 can be a solid structure, and the inlets may be positioned adjacent to the base of the lip structure 121.

The lip structure 121 is preferably at least semi rigid and may be made from rigid or semi-rigid materials. In some alternative variations, the lip structure 121 may be made from a flexible material or include a flexible portion. A flexible portion may enable flexing about the base, the mid-section, at the edge, or at any suitable portion.

Figure 23:
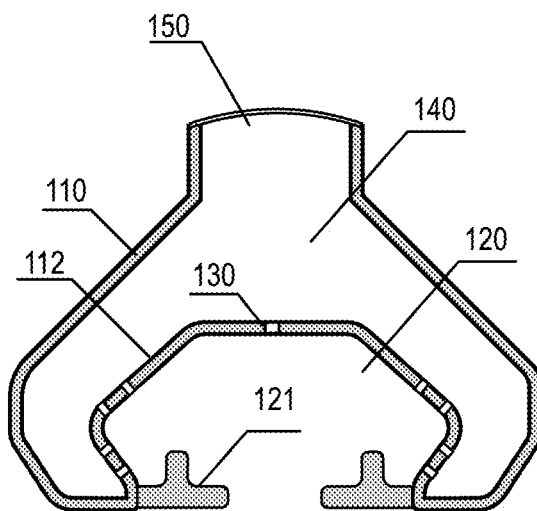
FIGS. 23 and 24 are side cross sectional schematic representations of exemplary variations of the end effector.

The lip structure 121 may be a substantially flat structure. However, the lip may have patterned structures (protrusions, troughs, etc.) and/or other features. The lip structure 121 preferably extends transverse to the central direction of force under pressure. For example, if the primary direction of pressure force at the chamber opening is upward in the longitudinal direction, then the lip structure 121 at least partially extends in the horizontal direction. In alternative variations, the lip may be angled downward, upward or otherwise have some form of slope or additional structural feature as shown in FIG. 23.

The lip structure 121 can include a low-friction, rounded edge along the chamber opening, which functions to better allow the bag to be pulled into the inner chamber 120. The lip structure 121 may alternatively or additionally include a discrete edge to promote a crease point on the hag after the bag is engaged with inlets on or near the lip structure 121.

In some hybrid variations, the end effector includes transitional air channels 125, which function to facilitate establishing a transitional region between the chamber opening and the suction cup system 160. This may have the potential benefit of automatic adaptive grasping of different types of bagged items. For example, the transitional air channels 125 can allow selective handling of tightly bagged objects and loosely bagged objects. The transitional air channels 125 leak air to the suction cup when bag material isn't fully grasped within the inner chamber 120. In this way, the transitional air channels 125 can enable the suction cup system 160 to grasp a tightly bagged object with bag material lacking flexibility to fully engage within the inner chamber 120. However, when engaging with a loosely bagged object, the bag material can be suitably gripped within the inner chamber 120.

The transitional air channels 125 can be defined grooves between the chamber opening and an outer edge of the sealing lip 161. The transitional air channels 125 can extend from an inner edge of the concave inner chamber 120 (at or near the chamber opening) toward the sealing lip 161. The air channels 125 may only extend partly toward the edge of the sealing lip 161. The transitional air channels may be periodically placed in a ring around the opening, but any suitable pattern may be used. In one implementation, the internal structure 112 includes a set of flanges that extend at least partially in the horizontal direction. In such a variation, the internal structure 112 can be made of rigid material that is inserted into a central opening of the suction cup system 160. In this way, the flanges extend outward from the chamber opening. The flanges establish side walls and the surface of the sealing lip 161 can serve as a bottom surface of the channel.

In another implementation, the sealing lip 161 may include ridges that run to where the internal structure 112 engages with the opening of the suction cup system 160, wherein the ridges define cavities extending from the chamber opening toward the outer edge of the sealing lip 161. The transitional air channels 125 can be defined as linear channels, but may alternatively be any suitable shape. For example, a network of defined channels may connect the outer edge of the chamber opening to an outer region of the sealing lip 161.

The array of inlets 130 functions to define a plurality of through-channels extending through the walls of the body 110 so that a pressure force can be applied from the inner chamber 120. The array of inlets 130 is preferably positioned on the internal walls of the internal structure 112 defining the concave inner chamber 120. In one variation, the inlets 130 are arranged primarily or entirely on the top internal wall 122. In one such variation, the inlets 130 may be made from a mesh or grid. In some variations, subsets of the inlets (e.g. one or more) can be positioned on the top internal wall 122, side internal wall 123, and/or lip internal wall 124.

An inlet can be a small defined cavity in the body 110. The defined through-channel may be cylindrically shaped. In another variation, an inlet could be a long slit making a more rectangular defined through-channel. In one variation, the array of inlets 130 or at least a subset of the array of inlets 130 may be formed through mesh material. An inlet may alternatively use any suitable shape, arrangement and have any suitable dimension. Additionally, the inlets of the array of inlets 130 may be substantially uniform but may alternatively have different dimensions and shapes, which may be configured to each inlet's role.

Portions of the array of inlets 130 may be distributed in distinct regions. The arrangement and configuration of the inlets 130 can be customized to the particular performance objectives of an end effector.

In some variations, the end effector may desire to pull bag material upward into the inner chamber 120 as much as possible. In this way, the array of inlets may be entirely or primarily located along a top internal wall 122.

In another variation, the placement may be configured to promote a desired way that a bag is pulled into the inner chamber 120 and then further pulled towards inlets towards the side and/or bottom. The array of inlets 130 may be configured to promote a desired flow and manipulation of a membrane when pulled into the inner chamber 120. The arrangement of the inlets can include configuration to promote a sequence of engagement between a gripped membrane and the array of inlets 130 such that inlets sequentially engage (i.e., flow is blocked) with the membrane in an expanding manner across the inner surfaces of the inner chamber 120 during the initial gripping of the object. The arrangement of the array of inlets 130 refers to the position and pattern of the inlets. The arrangement may additionally refer patterns in the properties of the inlets such as size and shape. In one variation, the arrangement is a series of outwardly expanding inlets, which can be a radiating pattern of inlets. The inlets may radiate symmetrically (or asymmetrically) from the top internal wall 122. A radiating pattern of inlets can function to promote the flow of a membrane material into the inner chamber 120 and initially up to the top internal wall inlet. When the centrally located inlets are blocked, the flow of the membrane may be pulled to cover the inlets proximate to and possibly surrounding the covered inlets. This can continue until substantially all inlets are blocked thereby the membrane is held by inlets in strategically placed positions like the lip internal wall 124. Any suitable arrangement may alternatively be used.

As shown in FIG. 10A, one exemplary variation can include a first subset of inlets (e.g., one inlet) in a region proximate to the top internal wall 122 (e.g., centered at the top, around the center top, etc.), a second subset of inlets along a lower portion of the side internal walls 123, and a third subset of inlets on the lip internal wall 124.

In a variation including a lip structure 121, at least a subset of the inlets is positioned on the lip structure 121 and/or proximate to the lip structure 121. When positioned on the lip structure 121, the inlets can be uniformly distributed across the lip internal wall 124, preferably in some pattern such as shown in FIG. 3B. When positioned proximate to the lip structure 121, a subset of the array of inlets 130 may be positioned adjacent to the base, which may be an approach used if the lip is substantially thin (e.g., in height) or does not have an internal channel as shown in FIG. 8.

In some variations, the array of inlets 130 preferably has inlets 130 positioned along the walls of the inner chamber 120 so that the inlets are directed in a variety of directions. This may function to diversify the directions of applied force. Herein, the direction of an inlet is characterized as a vector in the direction of flow defined along an axis substantially normal to the surface of the body at the position of the inlet. Additionally, a subset of the array of inlets 130 may be positioned offset to the outer side of the chamber opening. When the end effector includes an expanded inner chamber 120 and/or a lip structure 121, inlets are offset from the outer side of the chamber opening may better grip the bag material by promoting bending of the bag material against the lip structure 121.

In one variation, the array of inlets 130 include at least a first subset of inlets opening in the direction of the chamber opening and a second subset of inlets opening in a direction away from the chamber opening. For example, if the chamber opening is oriented to have airflow upwards, then a first subset of inlets is configured to also direct airflow upwards in one subregion of the inner chamber 120 and a second subset of inlets are configured to direct airflow downwards in another subregion of the inner chamber 120. In one particular variation, at least part of the second subset of inlets is positioned on the lip internal wall 124 but may alternatively be positioned in other directions as discussed above.

Figure 24:
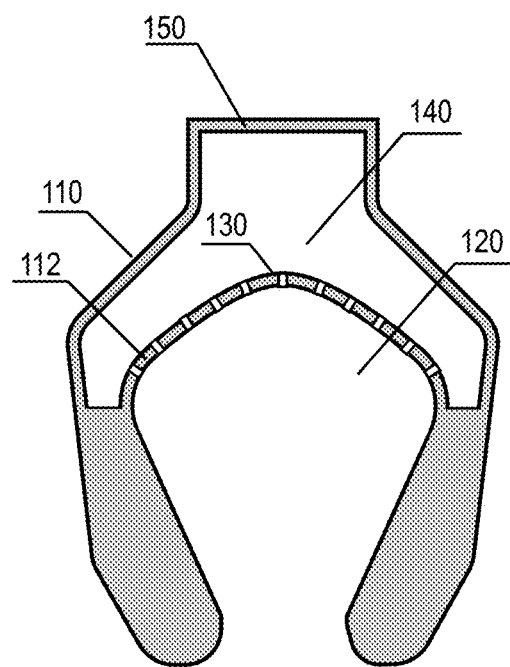

As shown in the alternative variation of FIG. 24, some variations may include inlets that are primarily offset from the chamber opening and that are oriented in a direction of the chamber opening (e.g., used in applying an at least partially upward force). This shows an exemplary variation that does not include inlets with a direction opposing the direction of the chamber opening.

Figure 25A:
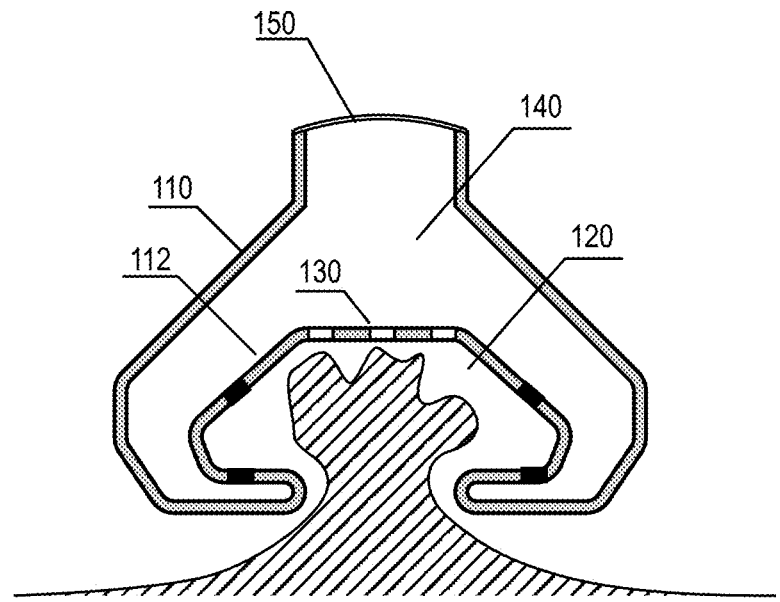
FIGS. 25A and 25B are side cross sectional schematic representations of actively controlled inlets being activated at different stages of grasping.
Figure 25B:
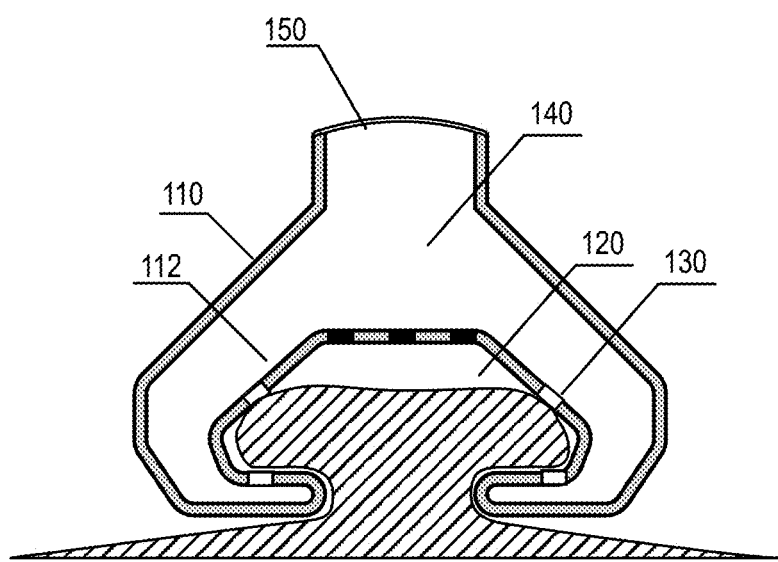

In one variation, the array of inlets 130 may include one or more actively controlled inlets. An actively controlled inlet is preferably one that can change its open-state. In one variation, an actively controlled inlet can open and close. In another variation, an actively controlled inlet can alter the amount of openness to let more or less air through. In one implementation of a controlled inlet, the system includes a controlled valve that can be opened and closed according to a control signal. Other suitable mechanisms may be used. In some instances a plurality of inlets may be controlled through one mechanism. Actively controlled inlets may be controlled in a manner coordinated with grasping. For example, the controlled inlets may be in one state when initial pulling the bag into the inner chamber 120 as shown in FIG. 25A and then in a different state for subsequent grasping of the bag as shown in FIG. 25B.

The defined internal channel 140 functions as an open volume contained by the walls of the body structure 110. The internal channel 140 fluidically couples a vacuum line interface 150 with the inner chamber 120 through the array of inlets 130. The internal channel 140 may be an open cavity. In some variations, the body structure 110 may be made of a connected rigid material that forms the external surface and the inner chamber, which may include the internal channel 140. In another variation, the internal channel 140 may be the defined cavity between the bellows of a suction cup system 160 and an internal structure 112. The internal channel 140 may alternatively be the defined cavity when the end effector connects with a vacuum line interface 150. In one particular implementation, the internal channel 140 may be one or more tubes connecting the inlets to the vacuum line interface 150.

The vacuum line interface 150 functions as the defined space through which a pressure system can establish fluidic coupling with the inlets. A decreased pressure at the vacuum line interface 150 preferably results in air flow and inward pressure force at each of the array of inlets 130 as well as an inward pressure force across the chamber opening. The end effector preferably includes a vacuum line interface, which functions as a connector to a pressure line and/or an actuation system. The vacuum line interface preferably defines the cavity of the vacuum line interface 150. The vacuum line interface can be a threaded fastener, a locking mechanism, friction fit, snap fit, and/or any suitable mechanism to couple to a pressure line and/or an actuation system. The actuation system may alternatively attach to or be physically coupled at a different position on the body structure 110. In one variation the vacuum line interface can be a magnetized attachment face for magnetic attachment to an actuation system and pressure system.

As discussed, in some variations, the end effector may be integrated into or formed as part of a hybrid end effector. In a hybrid variation, the end effector may include a suction cup system 160 which may be attached to and/or be part of the body structure 120. The suction cup system 160 with a sealing lip 161 extending beyond the object engagement region of the inner chamber 120. The suction cup system 160 functions to provide a suction cup mechanism that is usable for grasping some types of objects.

The suction cup system 160 may help make an initial seal with a hag or object using the compliance of the suction cup. sealing lip 161 If a bag, the bag material may then be pulled inside of the inner chamber 120 of the rigid body structure 110 for grasping. The flexible scaling lip 161 may additionally enable the end effector system to function across a wider variety of objects. For example, a hybrid variation could grip flat, hard surfaces (e.g., a cardboard box) as well as loose polybags. This could be particularly useful in applications like in parcel handling.

Figure 21A:
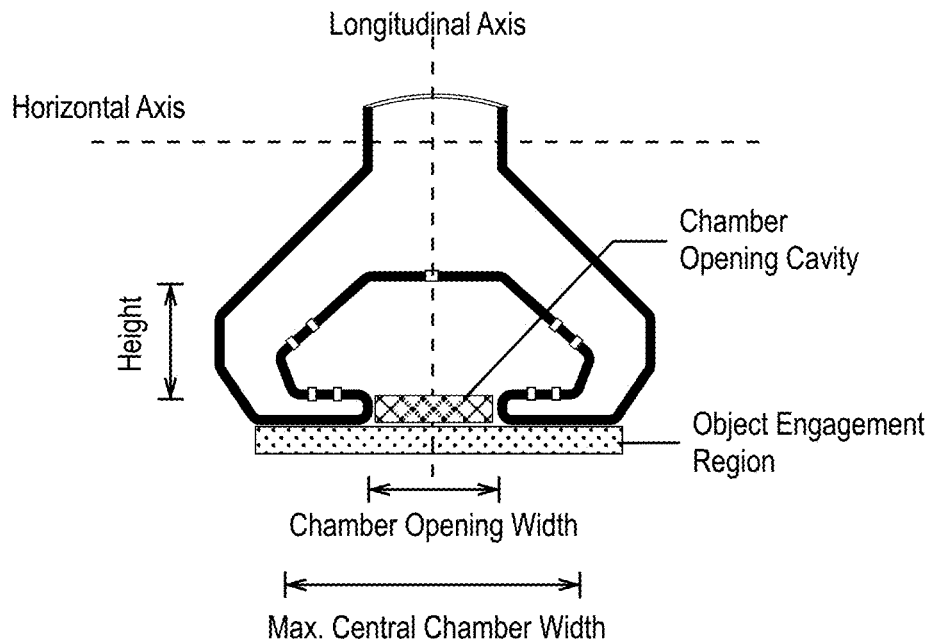
FIGS. 21A and 21B are side cross sectional schematic representations with exemplary dimensional terms.
Figure 21B:
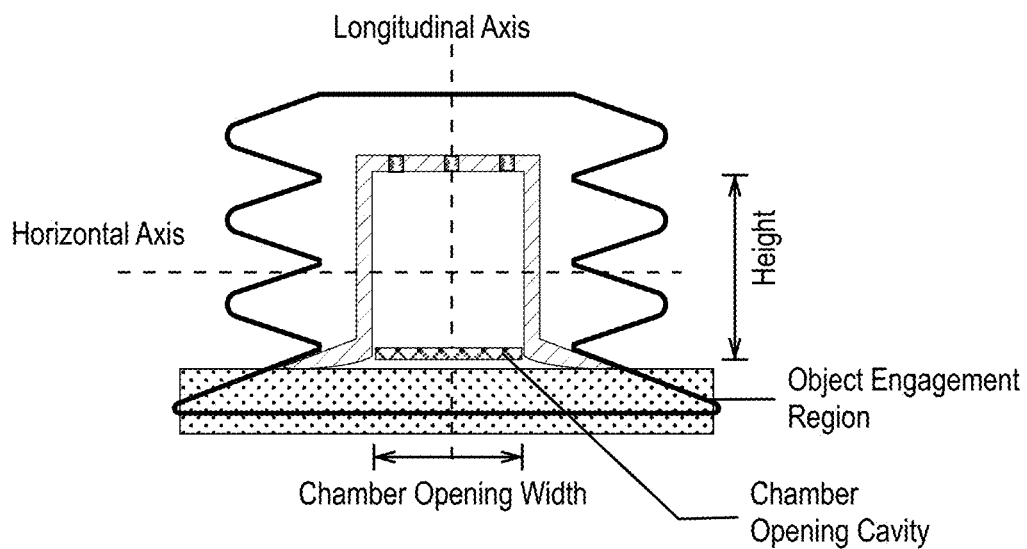

The suction cup system 160 preferably has an object engagement region that substantially aligns with that of the inner chamber 120. They are generally along parallel planes in close proximity as shown in FIG. 21B and may be coplanar.

Figure 28:
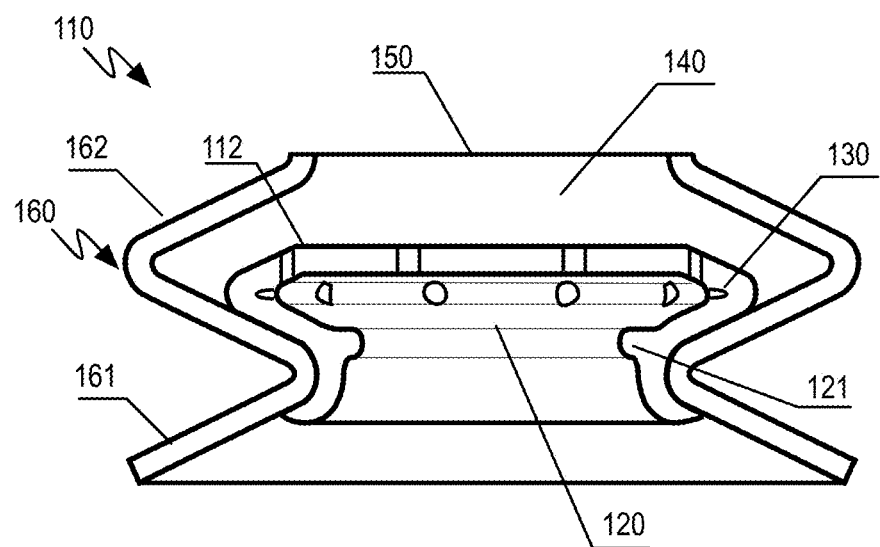
FIG. 28 is a cross sectional schematic representation of a hybrid variation of the end effector showing detail of the internal structure inserted in a suction cup system.

In one variation, the suction cup system 160 may completely surround the body structure 110. The suction cup system 160 may alternatively be positioned on the end of the end effector. In yet another variation, the suction cup system 160 may be used in combination with a rigid insert so that the defined internal channel 140 may be cooperatively formed from the suction cup system 160 and the rigid body structure 110 in the form of an insert, as shown in FIG. 28 and also shown in FIGS. 14-19. The suction cup system 160 can include structural features to hold the insert when fitted into place. Alternatively, the flexible suction cup 160 may be integrally attached to the rigid insert (e.g., overmolding around the insert).

The suction cup system 160 preferably includes at least a sealing lip 161 which is a flexible lip or flanges extending outward. The sealing lip 161 has a sealing surface in a connected path such as a ring, an ellipse, or any suitable path shape. The scaling lip 161 may include any suitable design features of a suction cup. The sealing lip 161 when engaging with suitable objects, makes contact across a surface, flexes, and establishes a sealed grasp of the object.

The suction cup system 160 can additionally include bellows 162. The bellows can provide flexibility when engaging with the surface of an object. In one variation, bellows 162 can be positioned on the distal end of the end effector near the suction cup head. In another variation, bellows 162 can occur on the proximal end of the end effector, closer to the vacuum line interface. In one variation, the bellows 162 can form an outer structure of the body structure 110. The bellows can be connected to the sealing lip. In one variation, the bellows and lip are made of one flexible material component.

In some variations, the end effector may additionally include a rigid shroud 180 that at least partially encloses the bellows. The rigid shroud 180 can be a rigid ring structure that extends horizontally outward from an upper portion (e.g., proximal side opposite the engagement region) past the bellows and then downward towards the object engagement side.

The above features and optional variations of the end effector may be combined in a variety of ways with a variety of different forms while still keeping to the disclosed concept of the end effector.

Figure 26:
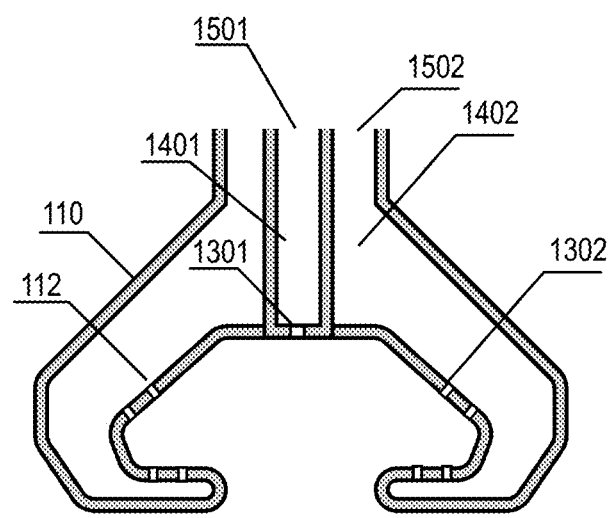
FIG. 26 is a side cross sectional schematic representation of a multi-channel variation of the end effector.

In one additional variation, the end effector system may include a body structure 110 with two or more defined internal channels 120 each connecting distinct vacuum line openings 150 and distinct arrays of inlets 130. As an example of such a variation, a first vacuum line interface 1501 may be coupled through a first defined internal channel 1401 to a first subset of inlets 1301 and a second vacuum line interface 1502 may be coupled through a second defined internal channel 1402 to a second subset of inlets 1302 as shown in FIG. 26. The end effector system may include individually controlled vacuum pressure systems or at least individually controlled pressure lines such that suction can be controlled individually for the different subsets of inlets.

This variation may be controlled such that during an initial gripping stage, a first subset is used to pull a bag into the inner chamber 120 while the second subset is inactive and during a subsequent gripping stage, a second subset of inlets is used to grip the bag material within the inner chamber 120 along inlets positioned for manipulation of the object. The second subset of inlets in one variation can be along the internal wall of the lip for example.

Figure 27:
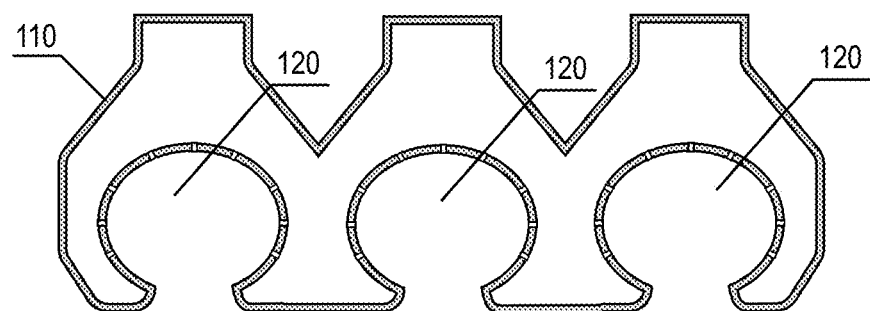
FIG. 27 is a side cross sectional schematic representation of a multi-chamber variation of the end effector.

In another additional variation, the end effector may include multiple distinct concave inner chambers 120 as shown in FIG. 27. These may each be controlled individually or controlled through a shared vacuum line interface 150. The different inner chambers 120 may be substantially identical or vary in various details. The multiple inner chambers 120 may be patterned along the object engagement region in any suitable manner.

In another additional variation, the end effector may include one or more internal lips as shown in FIG. 9. These internal lips may extend in a horizontal direction or may alternatively be oriented in different directions. As with the lip structure 121 described herein, an internal lip variation can similarly have inlets positioned on or near a surface of the internal lip.

In some variations, the end effector maybe used as part of a multi-head end effector system that includes at least a first end effector and a second end effector, wherein at least one of the first or second end effectors is a bag grasping end effector such as described above.

Two end effectors are mentioned, but the multi-headed end effector system may include any suitable number of end effectors. The engagement regions of the first and the second end effectors may be aligned to be coplanar or substantially parallel planes. However, the end effector may alternatively be aligned along different planes.

The two end effectors may share a common connection to a common vacuum pressure system 170. Alternatively, the first and second end effectors may have distinct connections to independent vacuum pressure systems. In this way, the multi-head end effector system may include a first vacuum pressure system coupled to the first end effector and a second vacuum pressure system coupled to the second end effector.

Multiple end effectors may be used for redundancy for some implementations. In other implementations, the two end effectors are different types of end effectors for different grasping capabilities.

At least one of the end effectors is preferably a bag grasping end effector. For simplicity, the first end effector is described as being such a bag grasping end effector where it comprises a body structure with a vacuum line opening and an object engagement region, the vacuum line opening being configured to couple at least one pressure line of a vacuum pressure system to a defined internal channel of the body structure; the body structure comprising a suction cup system that comprises a flexible scaling lip at the object engagement region; the body structure comprising an internal structure defining a concave inner chamber with a chamber opening at the object engagement region, the chamber opening being positioned within a grasping region of the sealing lip; the internal structure comprising an array of inlets positioned along at least one wall of the concave inner chamber, wherein each inlet defines an opening in the body to the defined internal channel.

Figure 29:
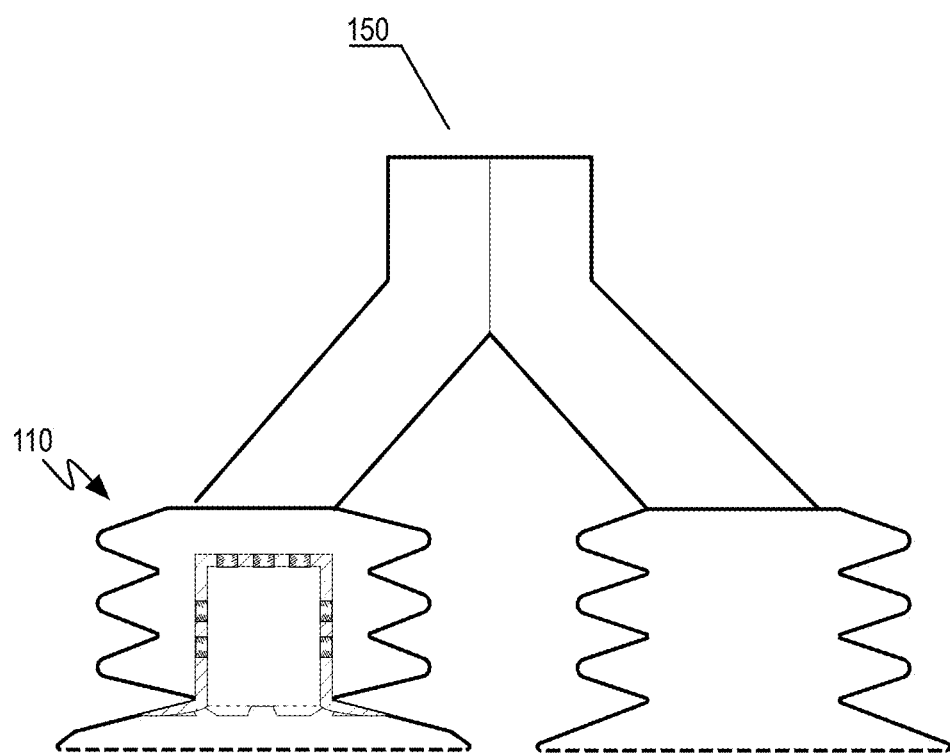
FIG. 29 is a cross sectional schematic representation of a multi-headed end effector system with one bag gripping end effector and one suction cup end effector.

The second end effector in one variation could be a suction cup end effector as shown in FIG. 29. The second end effector may alternatively be any suitable type of contact end effector.

Figure 30:
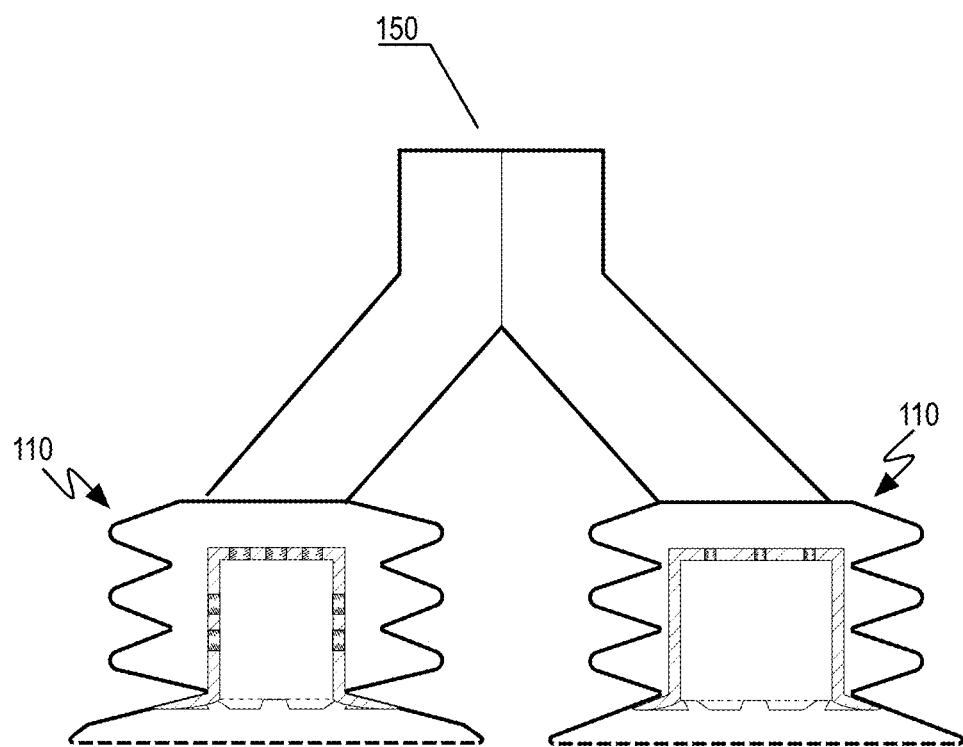
FIG. 30 is a cross sectional schematic representation of a multi-headed end effector system with two types of a bag gripping end effectors.

The second end effector in another variation could be another type of bag grasping end effector. It may be configured differently from the first end effector for diversified grasping capabilities. In one example shown in FIG. 30, the chamber diameter of the opening of the first end effector can differ from the diameter of the chamber opening of the second end effector. The first and second end effector may alternatively include any other combination of differing features and/or configurations.

The end effector is not limited to only these features and could include any suitable features of an end effector or be combined with other end effector components or pick and place robotic system elements.

As a person skilled in the art will recognize from the previous detailed description and from the figures and claims, modifications and changes can be made to the embodiments of the invention without departing from the scope of this invention as defined in the following claims.

We claim:

1. An end effector for a pick-and-place system comprising:
    a body structure with a vacuum line opening and an object engagement region, the vacuum line opening being configured to couple at least one pressure line of a vacuum pressure system to a defined internal channel of the body structure;
    the body structure comprising a defined concave inner chamber with a chamber opening at the object engagement region;
    a lip structure extending from the body structure and at least partially defining the chamber opening to the defined concave inner chamber; and
    an array of inlets positioned along walls of the defined concave inner chamber and oriented multidirectionally relative to the defined concave inner chamber, wherein each inlet defines an opening in the body structure to the defined internal channel, and wherein at least one inlet is formed through an inner portion of the lip structure and oriented away from the object engagement region.

2. The end effector of claim 1, wherein the array of inlets comprises at least a first subset of inlets opening in a direction of the chamber opening and a second subset of inlets opening in a second direction away from the chamber opening.

3. The end effector of claim 2, wherein at least part of the second subset of inlets is positioned on the inner portion of the lip structure.

4. The end effector of claim 1, wherein the inlets of the array of inlets are arranged within the defined concave inner chamber with an arrangement that radiates symmetrically from a top internal wall to the inner portion of the lip structure.

5. The end effector of claim 1, wherein the lip structure extends inward from the body structure to define a rounded shape of the chamber opening.

6. The end effector of claim 5, wherein a subset of inlets of the array of inlets is uniformly distributed across the inner portion of the lip structure.

7. The end effector of claim 1, wherein the lip structure extends inward from a limited portion of the body structure, the lip structure covering over only a portion of the chamber opening.

8. The end effector of claim 1, wherein the body structure is made from rigid material.

9. The end effector of claim 1, wherein the body structure is made from semi-rigid material.

10. The end effector of claim 1, wherein the lip structure is made from a flexible material.

11. The end effector of claim 1, wherein the lip structure includes a low-friction, rounded edge.

12. The end effector of claim 1, further comprising a flexible suction cup extending beyond the object engagement region of the body structure.

13. An end effector for use with a vacuum pressure system in controllably engaging an object, comprising:
    an at least semi-rigid body structure;
    the body structure comprising a defined concave inner chamber with a chamber opening at an object engagement region of the end effector, wherein the defined concave inner chamber has an internal width greater than the chamber opening;
    a lip structure extending from the body structure and at least partially defining the chamber opening to the defined concave inner chamber;
    the body structure including an array of inlets defining channel openings through at least one wall of the body structure to the defined concave inner chamber and oriented multidirectionally relative to the defined concave inner chamber, and wherein at least one inlet is formed through an inner portion of the lip structure and oriented away from the object engagement region such that an applied vacuum flow therethrough may be utilized to pull a portion of the object which may at least transiently occupy the defined concave inner chamber into engagement with the inner portion of the lip structure;
    the body structure comprising a defined internal channel connecting to the array of inlets;
    the body structure comprising a vacuum line interface defining an opening to the defined internal channel; and
    a suction cup extending beyond the object engagement region of the body structure of the end effector.

14. The end effector of claim 13, wherein the array of inlets has at least a first subset of inlets opening in a direction of the chamber opening and a second subset of inlets opening in a second direction away from the chamber opening.

15. The end effector of claim 13, wherein the lip structure extends inward from the body structure on an object engagement side to at least partially define the chamber opening.

16. The end effector of claim 15, wherein at least a subset of the inlets is positioned on the inner portion of the lip structure.

17. The end effector of claim 15, wherein the lip structure extends inward from the body structure to define a rounded chamber opening.

18. The end effector of claim 17, wherein a subset of inlets of the array of inlets is uniformly distributed across the inner portion of the lip structure.

19. The end effector of claim 13, wherein the body structure is made from rigid material.

* * * * *